United States Patent [19]
Chang

[11] Patent Number: 6,026,203
[45] Date of Patent: Feb. 15, 2000

[54] POLARIZATION MIXER BASED ON WALK-OFF CRYSTALS, HALF-WAVE PLATES AND TEC FIBERS

[75] Inventor: Kok Wai Chang, Sunnyvale, Calif.

[73] Assignee: Hewlett-Packard Company, Palo Alto, Calif.

[21] Appl. No.: 09/126,702

[22] Filed: Jul. 30, 1998

[51] Int. Cl.[7] ........................................... G02B 6/00
[52] U.S. Cl. .............................................. 385/11; 359/485
[58] Field of Search ................... 385/1, 11, 12, 385/14, 147, 129, 16, 33; 359/483, 485, 495, 497, 498, 634, 256, 259, 122, 156; 372/43, 102, 703; 356/5.15, 28.5

[56] References Cited

U.S. PATENT DOCUMENTS

| | | | |
|---|---|---|---|
| 3,684,350 | 8/1972 | Wentz | 359/256 |
| 4,575,193 | 3/1986 | Greivenkamp, Jr. | 359/495 |
| 5,204,771 | 4/1993 | Koga | 359/281 |
| 5,574,553 | 11/1996 | McManamon et al. | 356/5.15 |
| 5,734,763 | 3/1998 | Chang | 385/11 |
| 5,943,372 | 8/1999 | Gans et al. | 455/506 |

*Primary Examiner*—Akm E. Ullah

[57] ABSTRACT

An optical subassembly and a method for mixing polarization components of light signals utilize an arrangement of walk-off crystals and half-wave plates. The optical subassembly can serve as a building block for fabricating a variety of optical devices, such as optical circulators, switches and filters. Preferably, the optical subassembly is utilized in conjunction with optical fibers having thermally expanded cores. The optical elements of the subassembly are arranged such that the optical subassembly is able to separate polarization components of two light beams and recombine them to form two new light beams. Each new light beam is formed by combining one polarization component of the first original light beam with a polarization component of the other original light beam. Various arrangements of walk-off crystals and half-wave plates can be utilized to construct the optical subassembly in accordance with the invention. By attaching the optical subassembly with another optical assembly, an optical device can be fabricated.

20 Claims, 15 Drawing Sheets

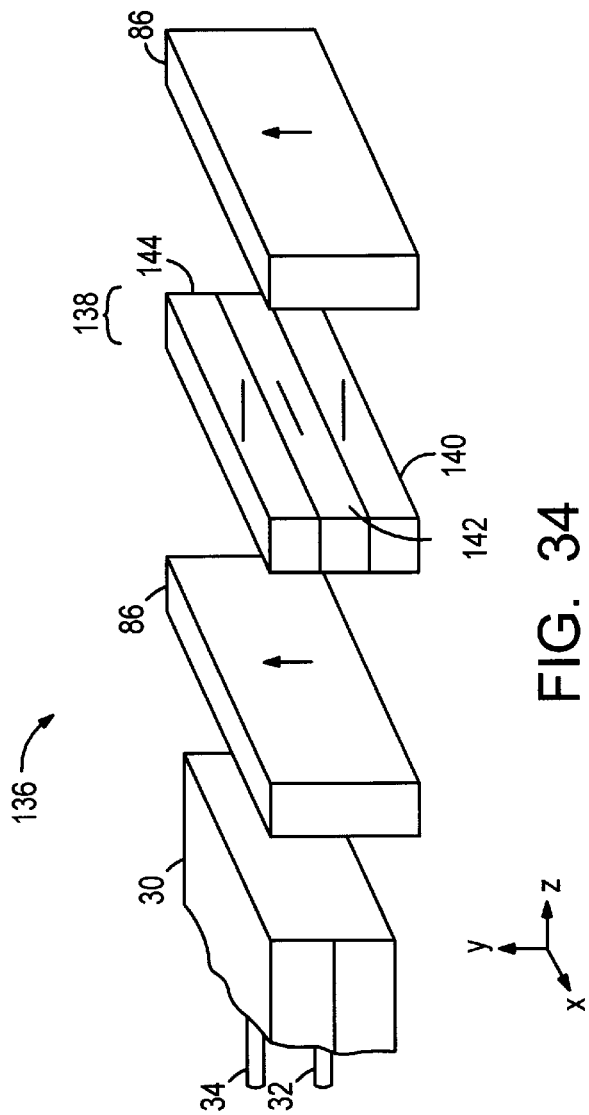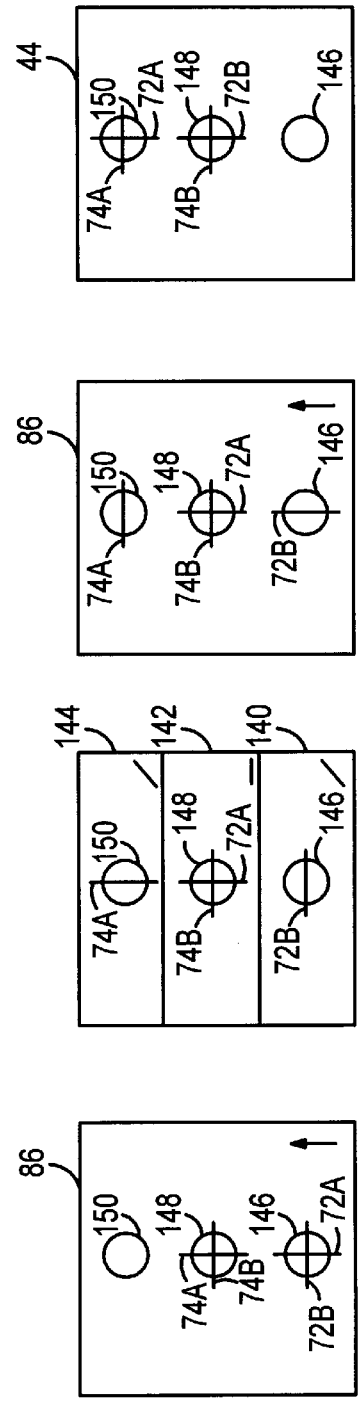

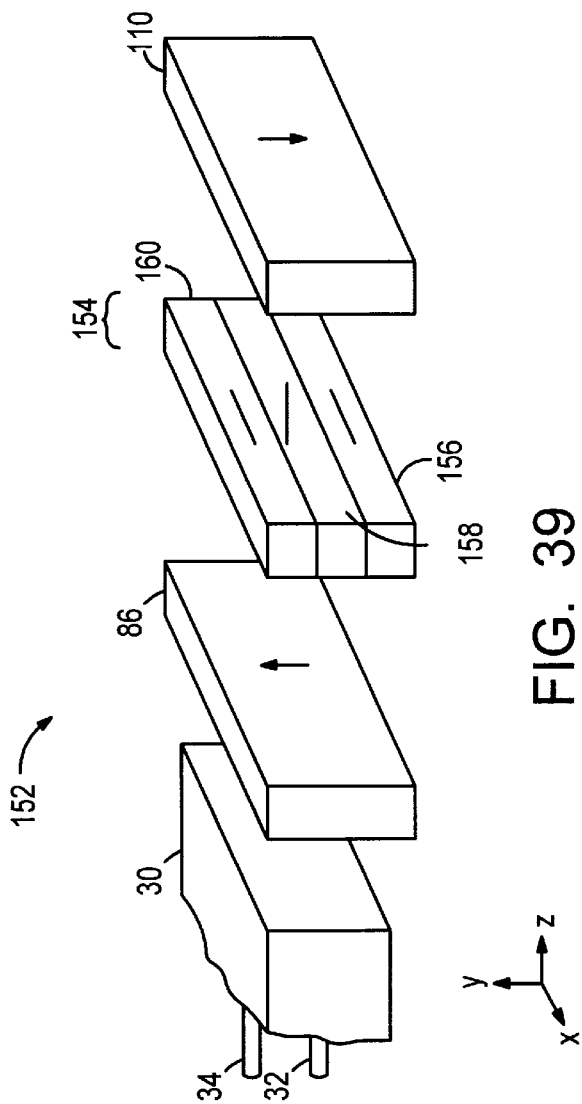
FIG. 39
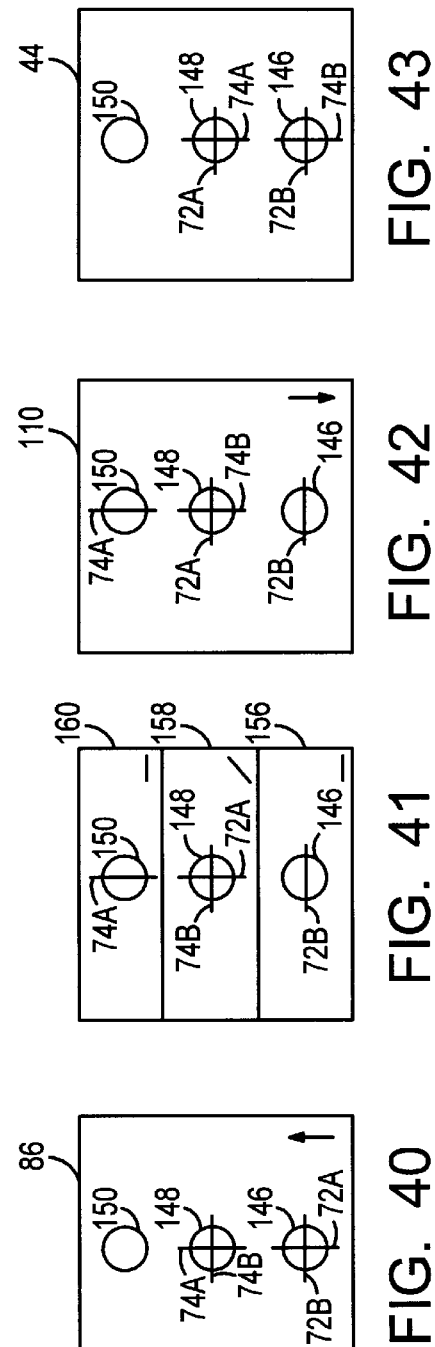
FIG. 40
FIG. 41
FIG. 42
FIG. 43

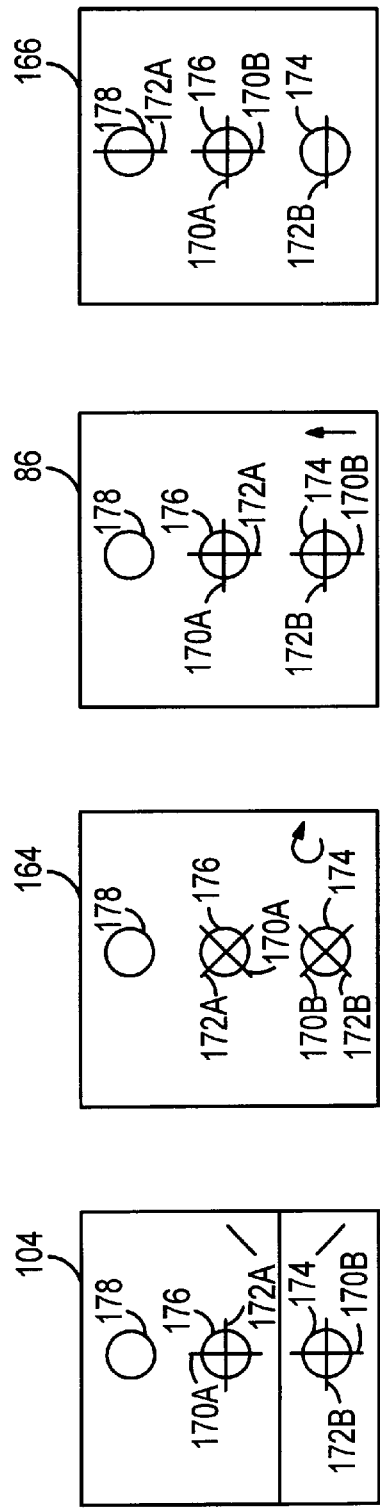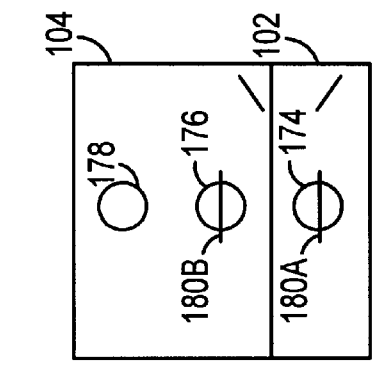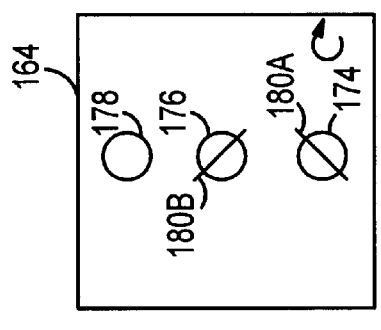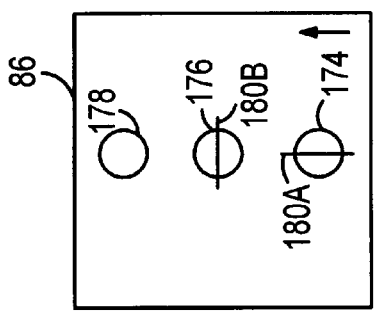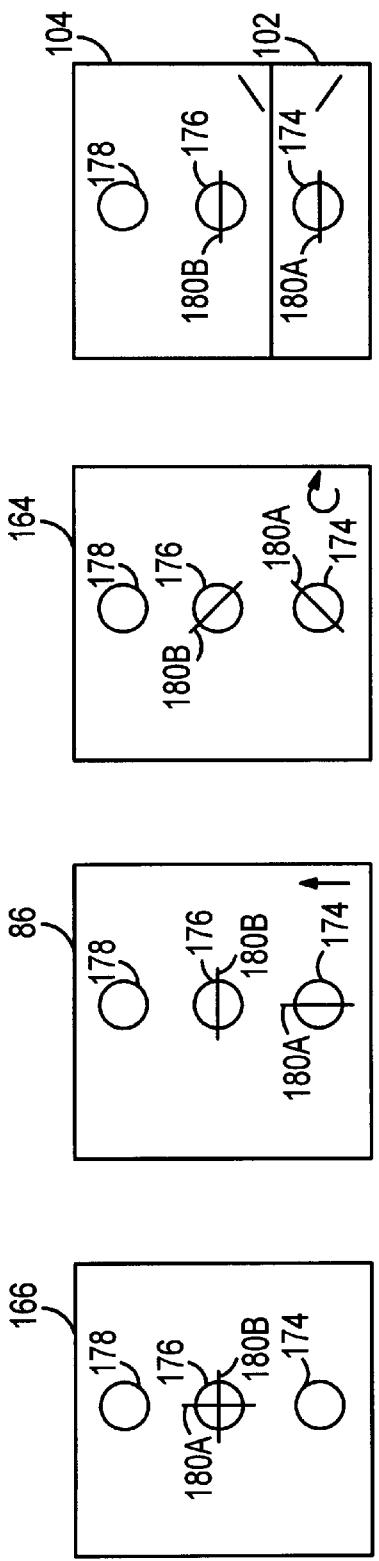

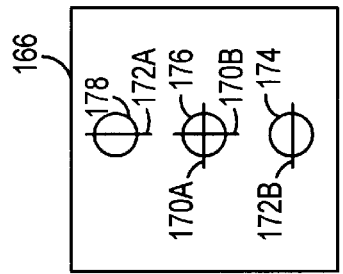
FIG. 58
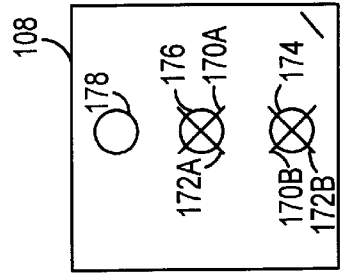
FIG. 57
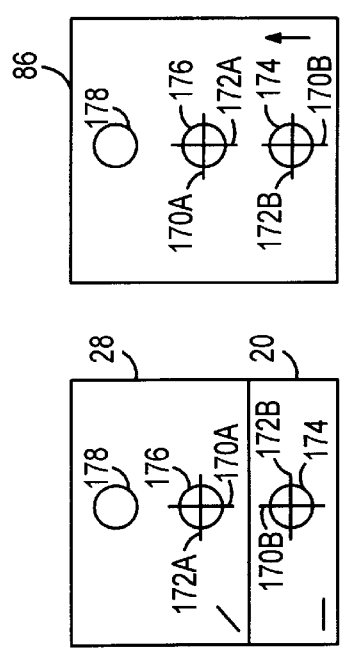
FIG. 56
FIG. 55
FIG. 54
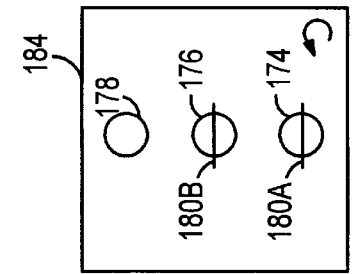
FIG. 63
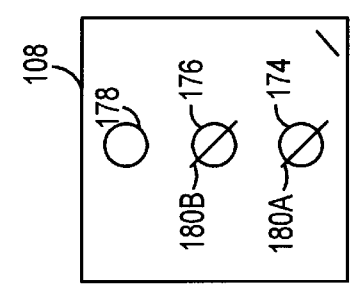
FIG. 62
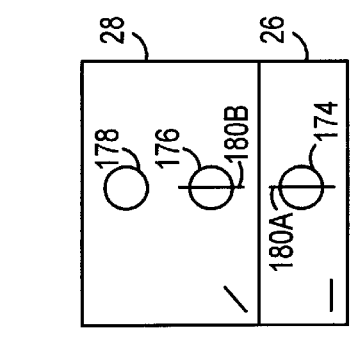
FIG. 61
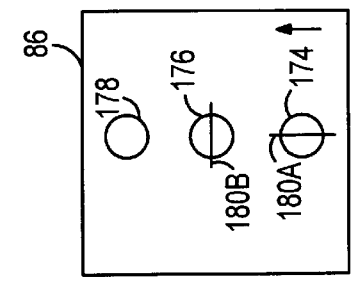
FIG. 60
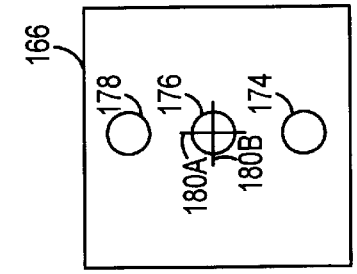
FIG. 59

POLARIZATION MIXER BASED ON WALK-OFF CRYSTALS, HALF-WAVE PLATES AND TEC FIBERS

TECHNICAL FIELD

The invention relates generally to optical devices and more particularly to a polarization mixer that can be utilized as a building block for fabricating optical circulators, switches, filters and other optical devices.

DESCRIPTION OF THE RELATED ART

Continuing innovations in the field of fiber optic technology have contributed to the increasing number of applications of fiber optics in different technologies. The flexibility and reliability of communication networks based upon transmission of light signals via optical fibers are greatly increased by the availability of optical devices, such as optical circulators, switches and filters. Optical circulators enable a bidirectional fiber to be coupled to both an input optical fiber and an output optical fiber, while optical switches allow light signals to be selectively transmitted through one or more optical fibers. Optical filters enable light signals having particular optical frequencies to be added into and/or removed from an optical fiber.

Typically, optical devices such as circulators, switches and filter are constructed of a number of discrete optical elements positioned in a predetermined arrangement. For example, U.S. Pat. No. 5,204,771 issued to Koga describes an optical circulator having three birefringent crystals and two non-reciprocal rotator assemblies. Each of the two non-reciprocal rotator assemblies is positioned between two adjacent birefringent crystals. The non-reciprocal rotator assemblies are comprised of a Faraday rotator, a left half-wave plate, and a right half-wave plate. The left half-wave plate provides a rotation of polarization components of light beams in a direction that is opposite to the direction of rotation caused by the right half-wave plate. The optical circulator of Koga includes an input/output port on one face of the optical circulator assembly. On the opposite face, an output port and an input port are positioned such that the input port is located above the output port. The optical circulator of Koga operates to transmit light signals received by the input port to the input/output port. However, light signals that are introduced by the input/output port are directed to the output port, instead of being directed to the input port.

U.S. Pat. No. 5,734,763 to Chang, which is assigned to the assignee of the present invention, describes optical subassemblies that may be utilized for assembling optical circulators, switches and filters. The Chang patent is specifically incorporated herein by reference. The optical subassemblies of Chang are based on birefringent walk-off crystals for mixing polarization components of light signals. The optical subassemblies are composed of two split walk-off plates. Each of the split walk-off plates includes two walk-off crystals having opposed walk-off directions. The split walk-off plates are positioned such that the walk-off directions of the first split plate are orthogonal to the walk-off directions of the second split plate. In operation, the optical subassembly of Chang receives light beams from two optical fibers. Two polarization components, one from each of the two light beams, are displaced to new locations by the first split plate. The other polarization component from each of the light beams is then displaced by the second split plate to combine with the previously displaced polarization components, such that two new light beams are formed having polarization components from each of the two original light beams.

While the known optical subassemblies for mixing polarization components operate well for their intended purposes, flexibility in the arrangement and type of optical elements utilized to fabricate an optical subassembly is desired. What is needed is an optical subassembly, not limited to birefringent crystals, for use in constructing a variety of optical devices for transmitting signals, such as light signals within a communication network. What is further needed is such an optical subassembly that accommodates a high density of input/output ports and that provides a significant cost efficiency in the fabrication process.

SUMMARY OF THE INVENTION

An optical subassembly and a method for mixing polarization components of lights signals utilize an arrangement of walk-off crystals and half-wave plates. The optical subassembly can serve as a building block for fabricating a variety of optical devices, such as optical circulators, switches and filters. Preferably, the optical subassembly is utilized in conjunction with optical fibers having thermally expanded cores (TECs).

The optical subassembly is an arrangement of optical elements that is able to separate polarization components of light beams from a pair of optical fibers and recombine them such that the polarization components are mixed. The result is that two new light beams are formed in which each new light beam has a polarization component from each of the original light beams. A large number of arrangements for the optical subassembly are possible using walk-off crystals and half-wave plates.

The optical elements that comprise the optical subassembly may include an element made of a single orientation walk-off crystal or half-wave plate. However, other types of optical elements may also be included in the arrangement. For example, the optical subassembly may include a split walk-off plate that is formed by two walk-off crystals. The two walk-off crystals have opposite walk-off directions. Thus, the split walk-off plate provides displacement of similarly aligned polarization components in opposite directions, with the displacement of each polarization component depending on which one of the two walk-off crystals is positioned along the propagation path of the polarization component.

Another type of optical element that can be utilized by the optical subassembly is a split half-wave component. Similar to the split walk-off plate, the split half-wave component is constructed of two half-wave plates. The split half-wave component may be positioned such that the two half-wave plates are side-by-side in a horizontal direction or in a vertical direction. The degrees and directions of rotation may vary, depending upon the desired operation of the split half-wave component. For example, the split half-wave component may be configured to provide 90° and 0° rotations. Alternatively, the split half-wave component may provide a 0° rotation and a 45° rotation in either directions.

Alternatively, the optical assembly of the invention may include a tri-level half-wave component as one of its optical elements. The tri-level half-wave component is comprised of three half-wave plates that are positioned side-by-side in the vertical direction. Similar to the split half-wave component, the degrees and directions of rotation can vary, depending upon the types of half-wave plates utilized. In one configuration, the top and bottom half-wave plates of the tri-level half-wave component provide 90° rotations, while the middle half-wave plate provides a 0° rotation for propagating polarization components. In other configurations, the top and bottom half-wave plates provide 0° rotations, while the middle half-wave plate provides a 90° rotation.

The optical assembly of the invention may also include a quadripartite half-wave component as one of its optical elements. The quadripartite half-wave component is comprised of four half-wave plates. Each of the half-wave plates forms a quarter section of the quadripartite half-wave component. The quadripartite half-wave component may be configured such that two of the diagonally opposite plates provide 90° rotations, while the other two diagonally opposite plates provide 0° rotations. Alternatively, the quadripartite half-wave component may be configured such that two abutting left half-wave plates provide 0° rotations, while the other two abutting plates provide 90° rotations.

An optical subassembly in accordance with the present invention can be constructed using the above-described optical elements in a number of configurations. For example, an optical subassembly may be constructed of a quadripartite half-wave component positioned between two walk-off crystals. Alternatively, an optical subassembly may be constructed of a tri-level half-wave component positioned between two walk-off crystals. Additional configurations are possible using the above-described optical elements to fabricate an optical subassembly for mixing polarization components.

As previously noted, the optical subassembly may be attached to another optical assembly to construct optical circulators, switches and filters. As an example, the optical subassembly may be positioned relative to three optical fibers such that the first and second optical fibers are situated adjacent to the forward face of the optical subassembly. Located between the rearward face of the optical subassembly and the third optical fiber is an optical assembly comprised of an arrangement of optical elements. The optical subassembly can operate with the optical assembly to transmit light signals from the first optical fibers to the third optical fiber, while inhibiting transmission of light signals from the second optical fiber to the third optical fiber. In addition, the optical subassembly and the optical assembly can operate to transmit light signals from the third optical fiber to the second optical fiber. Thus, the optical subassembly and the optical assembly form an optical circulator. Other optical devices may be constructed using the optical subassemblies in accordance with the invention as a building block for the devices.

A method of mixing polarization components of light signals utilizes an optical subassembly in accordance with the invention. Initially, first and second light beams are received at input ports that are located on the forward face of the optical subassembly. The first and second light beams are then spatially separated into their two orthogonal polarization components by the optical subassembly. Next, the polarization components are selectively rotated such that each of the polarization components of the first light beam is orthogonally orientated with respect to at least one of the polarization components of the second light beam. The polarization components are then combined such that third and fourth light beams are formed. Each of the third and fourth light beams is comprised of a polarization component of the first light beam and a polarization component of the second light beam. Lastly, the third and fourth light beams are transmitted via output ports located on the rearward face of the optical subassembly.

BRIEF DESCRIPTION OF THE DRAWINGS

FIGS. 4–9 illustrate the operations performed upon polarization components of forward propagating light beams through the polarization mixer of FIG. 1.

FIG. 34 is an exploded perspective view of a polarization mixer in accordance with a sixth embodiment of the invention.

FIGS. 35–38 illustrate the operations performed upon polarization components of forward propagating light beams through the polarization mixer of FIG. 34.

FIG. 39 is an exploded perspective view of a polarization mixer in accordance with a seventh embodiment of the invention.

FIGS. 40–43 illustrate the operations performed upon polarization components of forward propagating light beams through the polarization mixer of FIG. 39.

FIGS. 45–48 illustrate the operations performed upon polarization components of forward propagating light beams through the first optical assembly of FIG. 44.

FIGS. 49–52 illustrate the operations performed upon polarization components of rearward propagating light beam through the first optical assembly of FIG. 44.

FIGS. 54–58 illustrate the operations performed upon polarization components of forward propagating light beams through the second optical assembly of FIG. 53.

FIGS. 59–63 illustrate the operations performed upon polarization components of a rearward propagating light beam through the second optical assembly of FIG. 53.

DETAILED DESCRIPTION

Figure 1:
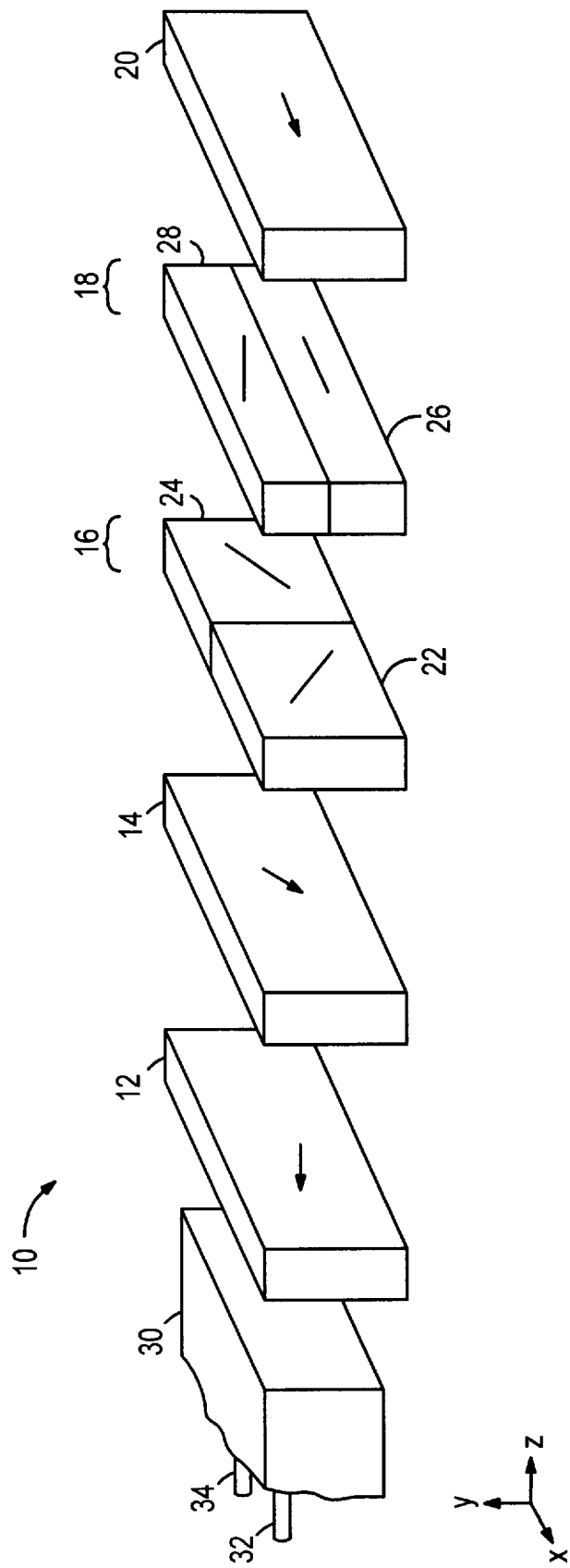
FIG. 1 is an exploded perspective view of a polarization mixer in accordance with a first embodiment of the invention.

With reference to FIG. 1, a polarization mixer 10 in accordance with a first embodiment of the invention can be utilized as a building block for an optical circulator, switch or filter. The polarization mixer 10 includes a first walk-off crystal 12, a second walk-off crystal 14, a first split half-wave component 16, a second split half-wave component 18, and a third walk-off crystal 20. The split half-wave component 16 is comprised of a right half-wave plate 22 and a left half-wave plate 24. The split half-wave component 18 is comprised of a lower half-wave plate 26 and an upper half-wave plate 28. A fiber holder 30 containing optical fibers 32 and 34 is positioned adjacent to the walk-off crystal 12. In the preferred embodiment, the optical fibers 32 and 34 are thermally expanded core (TEC) fibers. The distance of separation between the optical fibers 32 and 34 is preferably at least 125 μm. The optimal separation for the optical fibers 32 and 34 is 250 μm, but this is not critical.

Walk-off directions of walk-off crystals and directions of rotation caused by the half-wave plates will be described with respect to polarization components of light beams propagating in the forward direction, i.e., positive z-direction. The walk-off crystals 12, 14 and 20 may be made of rutile (titanium dioxide-$TiO_2$) or yttrium vanadate ($YVO_4$). In addition, inexpensive Lithium Niobate ($LiNbO_4$) may be used to form the walk-off crystals 12, 14 and 20. The walk-off crystals 12, 14 and 20 provide spatial displacement for aligned polarization components of light beams propagating through the walk-off crystals 12, 14 and 20. Aligned polarization components are defined here as polarization components that are parallel to a particular walk-off direction of a walk-off crystal. In addition, positive angles are measured from the x-axis in the counterclockwise direction. For example, positive y-direction is equivalent to a 90° direction.

In the forward direction, the walk-off crystal 12 displaces aligned polarization components in the positive 45° direction. The walk-off crystal 14 provides spatial displacement in the negative 45° direction for forward propagating polarization components, while the walk-off crystal 20 provides displacement in the positive x-direction.

The split half-wave component 16 is configured to provide two potential rotations for propagating polarization components. The right half-wave plate 22 provides a 45° rotation in the clockwise direction for forward propagating polarization components, while the left half-wave 24 provides a 45° rotation in the counterclockwise direction. The rotations caused by the split half-wave component 16 are dependent upon the propagation paths of the polarization components through the split half-wave component 16. For forward propagating polarization components having a propagation path through the right half-wave plate 22 of split half-wave component 16, the rotation will be 45° in the clockwise direction. If the propagation path of a forward propagating polarization component is through the left half-wave plate 24, the rotation will be 45° in the counterclockwise direction. Similarly, the split half-wave component 18 provides two potential rotations. However, the two potential rotations provided by the split half-wave component 18 are 90° and 0° rotations. The upper half-wave plate 28 of split half-wave component 18 rotates propagating polarization components by 90°, while the lower half-wave plate 26 rotates polarization components by 0°.

Figure 2:
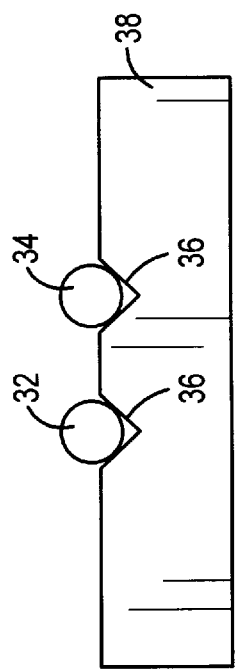
FIG. 2 is an end view of a silicon substrate having V-shaped grooves for precise positioning of an optical fiber.
Figure 3:
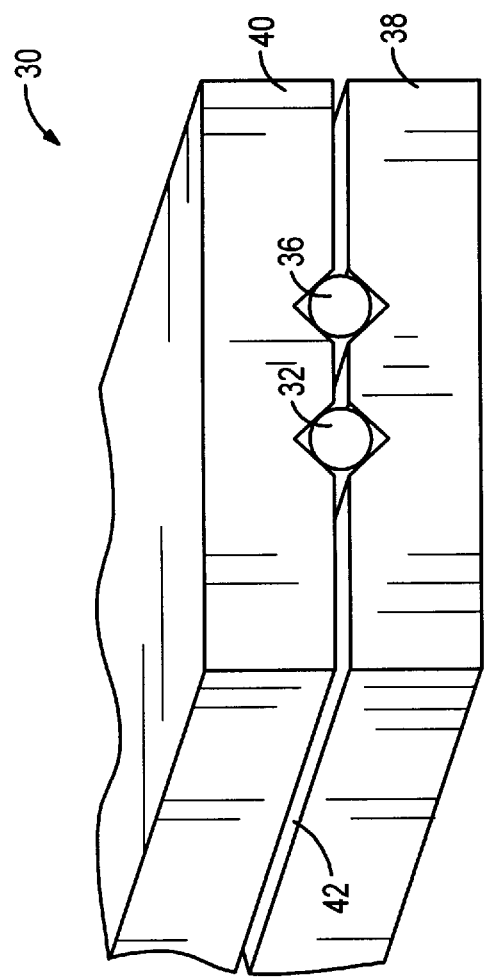
FIG. 3 is a partial perspective view of the silicon wafer of FIG. 2 having a second silicon substrate to sandwich the optical fibers into position.

The fiber holder 30 can be composed of semiconductor substrates. Preferably, the fiber holder 30 is etched to form V-shaped grooves to properly position the optical fibers 32 and 34. FIG. 2 illustrates the optical fibers 32 and 34 positioned on V-shaped grooves 36 that are etched on a substrate, such as a silicon wafer 38. Conventional integrated circuit fabrication techniques may be utilized to form the grooves 36. For example, the grooves may be formed photolithographically, using a mask to define the grooves and using chemical etchant. While not critical, the angle made by the two walls of a single V-shaped groove 36 is preferably 70.5°. The fiber holder 30 may also include another etched silicon wafer 40 that is affixed to the lower silicon wafer 38 by a layer of adhesive 42, as shown in FIG. 3. The use of an adhesive layer is not critical to the invention. Alternatively, wafer bonding may be used to attach the two silicon wafers 38 and 40.

FIGS. 4–9 illustrate the operation of the polarization mixer 10 on polarization components of light beams from the optical fibers 32 and 34 propagating in the forward direction, i.e., positive z-direction. The first five figures are illustrations of the relative positions of the polarization components at a forward face of one of the optical elements in the polarization mixer 10, as viewed from the position of the optical fibers 32 and 34. FIG. 9 is an illustration of the relative positions of the polarization components at a forward face of an optical assembly 44 that is positioned adjacent to the rearward face of polarization mixer 10 to form an optical circulator, switch or filter.

Figure 4:
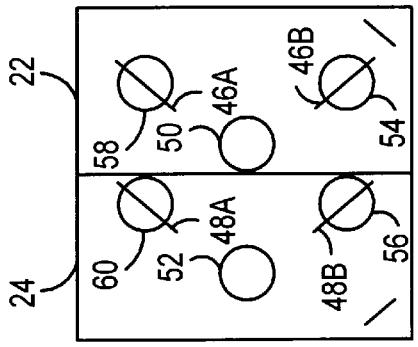

FIG. 4 shows two orthogonal polarization components 46A and 46B of a light beam from the optical fiber 32 that is to enter an input port, i.e., window, at the forward face of the walk-off crystal 12 of the polarization mixer 10. In addition, two orthogonal polarization components 48A and 48B of a light beam from the optical fiber 34 that is to enter a second input port are shown. The input ports are positioned at locations 50 and 52, which are defined by the axes of the optical fibers 32 and 34, respectively. Other relevant locations are referenced 54, 56, 58 and 60. As will become apparent, locations 54 and 58 are the positions of output ports on the rearward face of the walk-off crystal 20.

The two light beams from the optical fibers 32 and 34 enter the polarization mixer 10, encountering the walk-off crystal 12. As the light beams travel through the walk-off crystal 12, the aligned polarization components 46A and 48A are displaced in the walk-off direction of the walk-off crystal 12, separating the two light beams. The walk-off direction of the walk-off crystal 12 is indicated by the arrow in the lower right corner of FIG. 4.

Figure 5:
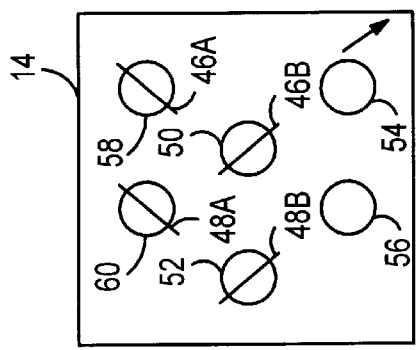
Figure 6:
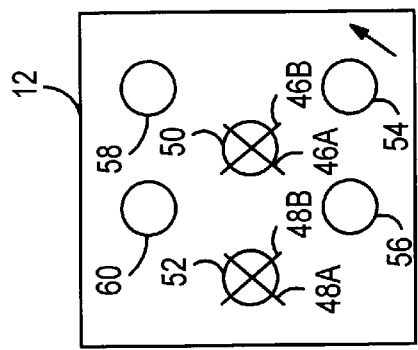
Figure 7:
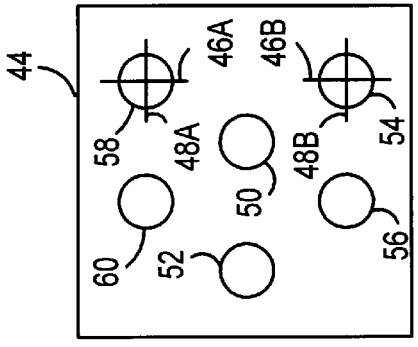
Figure 8:
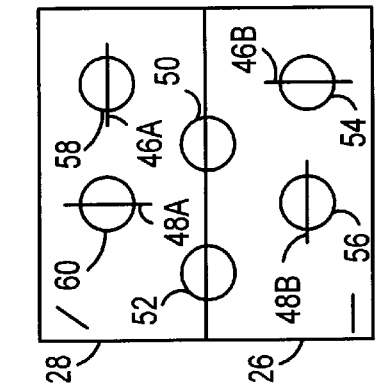

After traveling through the walk-off crystal 12, the polarization components 46A and 48A have been displaced from locations 50 and 52 to locations 58 and 60, respectively, as shown in FIG. 5. Next, the polarization components 46A, 46B, 48A and 48B travel through the walk-off crystal 14, which displaces the aligned polarization components 46B and 48B in the walk-off direction of the walk-off crystal 14. As shown in FIG. 6, the polarization components 46B and 48B have been displaced from locations 50 and 52 to locations 54 and 56, respectively. The polarization components 46A, 46B, 48A and 48B then encounter the split half-wave component 16. The polarization components 48A and 48B propagate through the left half-wave plate 24, while the polarization components propagate through the right half-wave plate 22. Shown in FIG. 7, the polarization components 48A and 48B have been rotated by 45° in the counterclockwise direction by the half-wave plate 24. Also shown in FIG. 7, the polarization components 46A and 46B have been rotated by 450 in the clockwise direction by the half-wave plate 24.

Next, the polarization components 46A and 48A propagate through the half-wave plate 28 of the split half-wave component 18, while the polarization components 46B and 48B propagate through the half-wave plate 26. Shown in FIG. 8, the polarization components 46A and 48A have been rotated 90° by the half-wave plate 28 of the split half-wave component 18. However, the polarization components 46B and 48B have not been rotated, because the operation of the half-wave plate 26 of the split half-wave component 18 provides a 0° rotation for propagating polarization components.

In FIG. 9, the polarization components 48A and 48B have been displaced from locations 60 and 56 to locations 58 and 54, respectively, by the walk-off crystal 20. The displacement of polarization components 48A combines the polarization components 46A and 48A to form a new light beam. Similarly, a new light beam is formed by combining the polarization components 46B and 48B. The polarization components 46A, 46B, 48A and 48B can be further manipulated by the optical assembly 44. The desired operation of the optical assembly 44 will depend upon the intended function of the optical device created by the polarization mixer 10 and the optical assembly 44.

Alternative configurations for the polarization mixer 10 are possible without affecting the final result of the polarization mixer 10. The positions of the walk-off crystals 12 and 14 can be switched, as well as the positions of the split half-wave components 16 and 18. In addition, the directions and degrees of rotation caused by the half-wave plates 22, 24, 26 and 28 of the split half-wave components 16 and 18 may be changed without affecting the overall operation of the split-wave plates 16 and 18. For example, the half-wave plate 22, 24, 26 and 28 can configured to provide a 45° rotation in the counterclockwise direction, a 45° rotation in the clockwise direction, a 90° rotation, and a 0° rotation, respectively.

Figure 10:
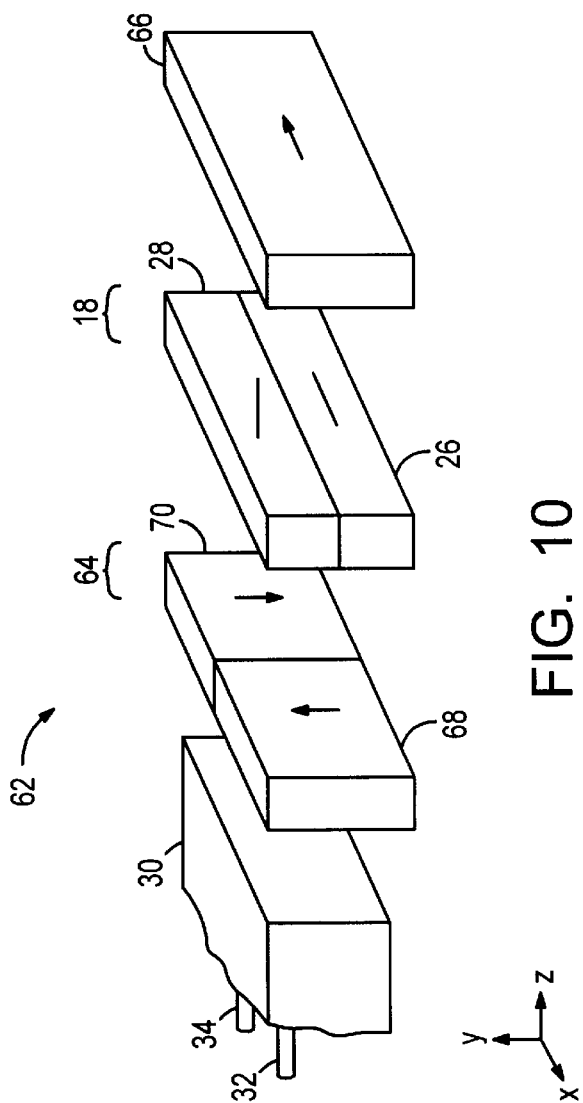
FIG. 10 is an exploded perspective view of a polarization mixer in accordance with a second embodiment of the invention.

Turning to FIG. 10, a polarization mixer 62 in accordance with a second embodiment of the invention is shown. When applicable, the same reference numerals from FIG. 1 will be utilized for identical components. Similar to the polarization mixer 10, the polarization mixer 62 may be utilized as a building block for an optical circulator, switch or filter. The polarization mixer 62 includes a split walk-off plate 64, the split half-wave component 18, and a walk-off crystal 66. The split walk-off plate 64 is comprised of a right walk-off crystal 68 and a left walk-off crystal 70. The right walk-off crystal 68 provides displacement of aligned polarization components in the positive y-direction, while the left walk-off crystal 70 provides displacement in the negative y-direction.

Figure 14:
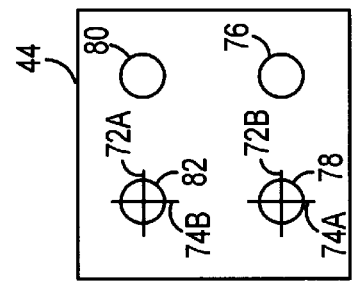
FIGS. 11–14 illustrate the operations performed upon polarization components of forward propagating light beams through the polarization mixer of FIG. 10.

FIGS. 11–14 illustrate the operation of the polarization mixer 62 on polarization components of light beams from the optical fibers 32 and 34 propagating in the forward direction. The first three figures are illustrations of the relative positions of the polarization components at a forward face of one of the optical elements in the polarization mixer 62, as viewed from the position of the optical fibers 32 and 34. FIG. 14 is an illustration of the relative positions of the polarization components at the forward face of optical assembly 44 that is positioned on the rearward face of polarization mixer 62 to form an optical circulator, switch or filter.

Figure 11:
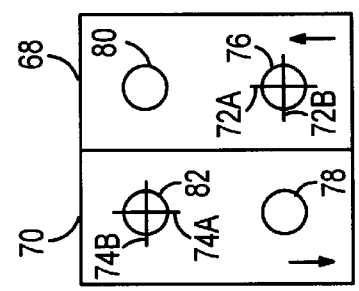

FIG. 11 shows the polarization components 72A and 72B from the optical fiber 32 and the polarization components 74A and 74B from the optical fiber 34 that are to enter input ports at the forward face of the split walk-off plate 64 of the polarization mixer 62. The input ports are positioned at locations 76 and 82, which are defined by the axes of the optical fibers 32 and 34, respectively. Other relevant locations are referenced 78 and 80. As will become apparent, locations 78 and 82 are the positions of output ports on the rearward face of the walk-off crystal 66.

Figure 13:
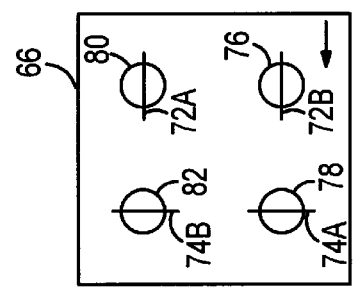
Figure 12:
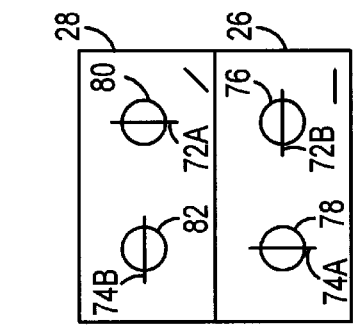

Shown in FIG. 12, the polarization component 74A has been displaced from location 82 to location 78 by the left walk-off crystal 70 of the split walk-off plate 64. In addition, the polarization component 72A has been displaced from location 76 to location 80 by the right walk-off crystal 68. In FIG. 13, the polarization components 72A and 74B have been rotated 90° by the upper half-wave plate 28. However, the polarization components 72B and 74A have not been rotated, because the lower half-wave plate 26 provides a 0° rotation. Next, the polarization components 72A and 72B are laterally displaced by the walk-off crystal 66. The lateral displacement combines the polarization components 72A and 72B with the polarization components 74B and 74A, respectively, as shown in FIG. 14. The combined polarization components 72A and 74B enter the optical assembly 44 at location 82, while the combined polarization components 72B and 74A enter the optical assembly 44 at location 78.

Figure 15:
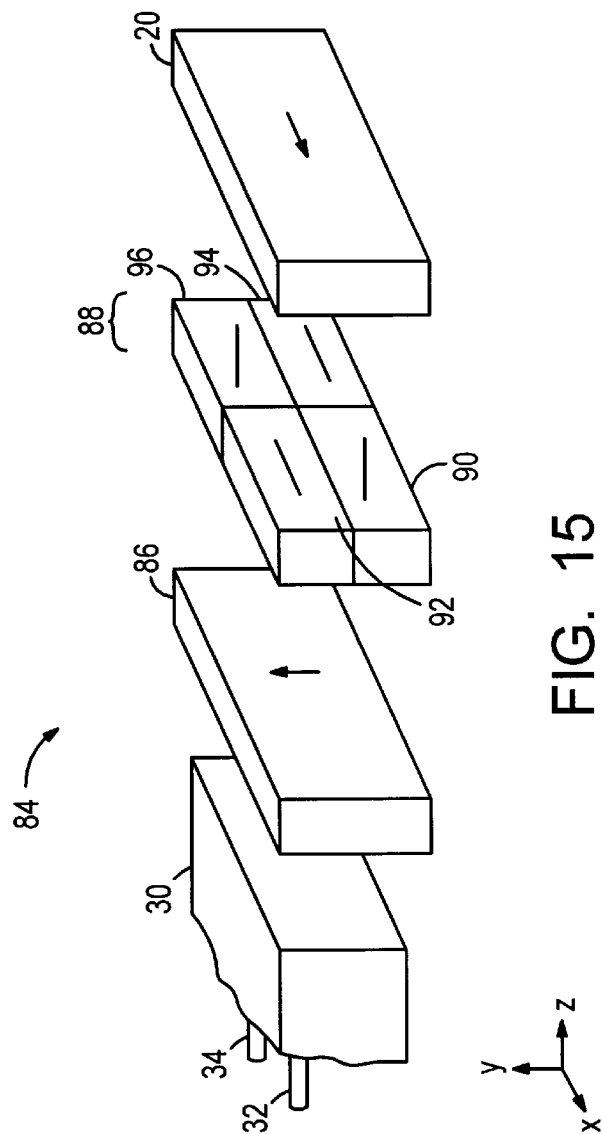
FIG. 15 is an exploded perspective view of a polarization mixer in accordance with a third embodiment of the invention.

With reference to FIG. 15, a polarization mixer 84 in accordance with a third embodiment of the invention is shown. When applicable, the same reference numerals from FIGS. 1 and 10 will be utilized for identical components. Again, the polarization mixer 84 may be utilized as a building block for an optical circulator, switch or filter. The polarization mixer 84 includes a walk-off crystal 86, a quadripartite half-wave component 88 and the walk-off crystal 20. The walk-off crystal 86 provides displacement for aligned polarization components in the positive y-direction. The quadripartite half-wave component 88 is comprised of four half-wave plates 90, 92, 94 and 96. Each of the half-wave plates 92 and 94 provides a 0° rotation for propagating polarization components. However, each of the half-wave plates 90 and 96 provides a 90° rotation.

FIGS. 16–19 illustrate the operation of the polarization mixer 84 on the polarization components 72A, 72B, 74A and 74B of light beams from the optical fibers 32 and 34 propagating in the forward direction. Each of the figures is an illustration of the relative positions of the polarization components at a forward face of one of the optical elements in the polarization mixer 84 or at the forward face of optical assembly 44, as viewed from the position of the optical fibers 32 and 34.

Figure 16:
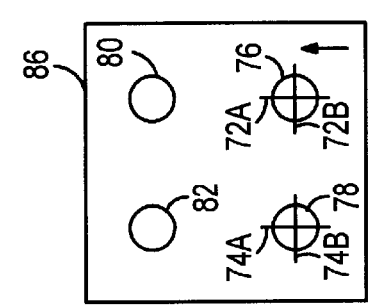

FIG. 16 shows the polarization components 72A and 72B from the optical fiber 32 and the polarization components 74A and 74B from the optical fiber 34 that are to enter input ports at the forward face of the walk-off crystal 86 of the polarization mixer 84. Unlike the input ports of polarization mixer 62 in FIG. 11, the input ports of polarization mixer 84 are positioned at locations 76 and 78, which are defined by the axes of the optical fibers 32 and 34, respectively. Other relevant locations are referenced 80 and 82. Locations 76 and 80 are the positions of output ports on the rearward face of the walk-off crystal 20.

Figure 19:
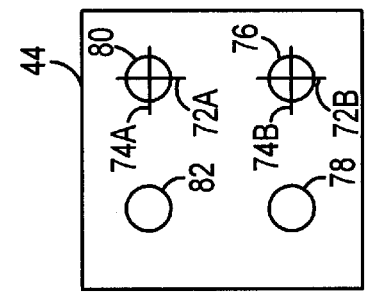
FIGS. 16–19 illustrate the operations performed upon polarization components of forward propagating light beams through the polarization mixer of FIG. 15.
Figure 18:
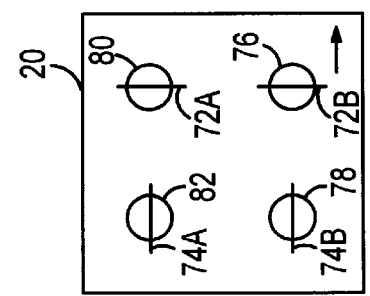
Figure 17:
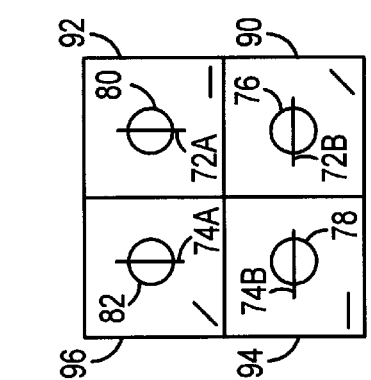

Shown in FIG. 17, the polarization component 72A and 74A have been displaced from locations 76 and 78 to location 80 and 82, respectively, by the walk-off crystal 86. In FIG. 18, the polarization components 72B and 74A have been rotated 90° by the half-wave plates 90 and 96, respectively. However, the polarization components 72A and 74B have not been rotated, because the half-wave plates 92 and 94 provide a 0° rotation. Next, the polarization components 74A and 74B are laterally displaced by the walk-off crystal 20. The lateral displacement combines the polarization components 74A and 74B with the polarization components 72A and 74B, respectively, as shown in FIG. 19. The combined polarization components 72A and 74A enter the optical assembly 44 at location 80, while the combined polarization components 72B and 74B enter the optical assembly 44 at location 76.

Figure 20:
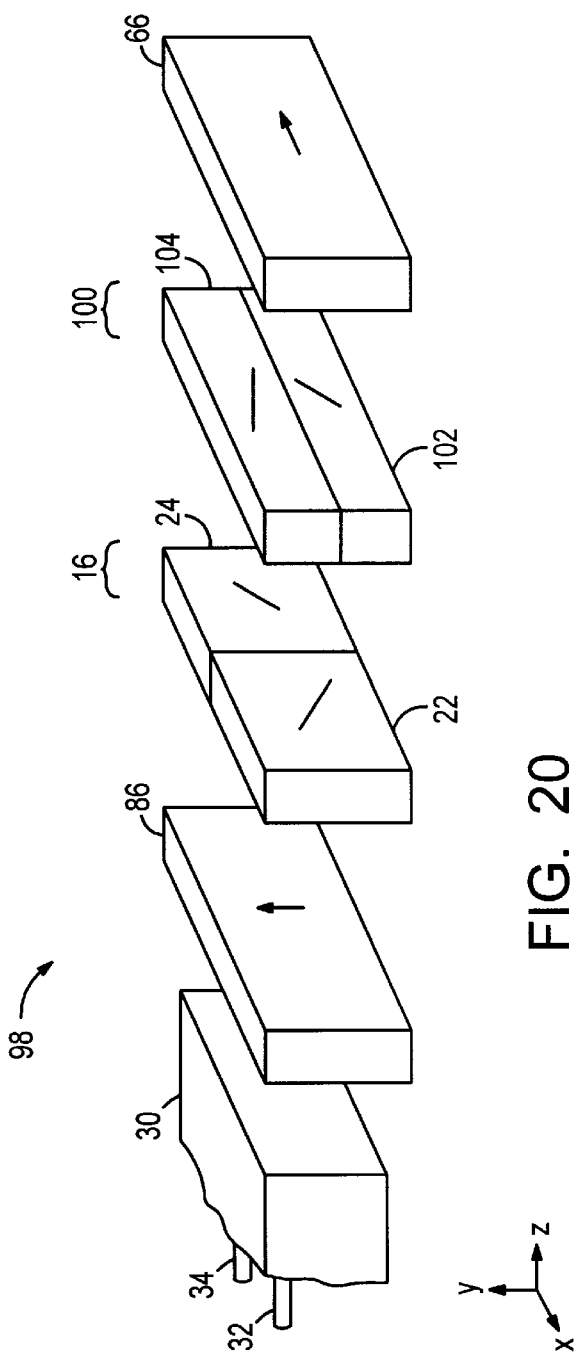
FIG. 20 is an exploded perspective view of a polarization mixer in accordance with a fourth embodiment of the invention.

Turning to FIG. 20, a polarization mixer 98 in accordance with a fourth embodiment of the invention is shown. When applicable, the same reference numerals from FIGS. 1, 10 and 15 will be utilized for identical components. Again, the polarization mixer 98 may be utilized as a building block for an optical circulator, switch or filter. The polarization mixer 98 includes the walk-off crystal 86, the split half-wave component 16, a split half-wave component 100, and the walk-off crystal 66. The split half-wave component 100 is comprised of lower and upper half-wave plates 102 and 104, respectively. The lower half-wave plate 102 provides a 45° rotation in the clockwise direction for forward propagating polarization components, while the upper half-wave plate 104 provides a 45° rotation in the counterclockwise direction. In an alternative configuration, the positions of the split half-wave components 16 and 100 are switched.

FIGS. 21–25 illustrate the operation of the polarization mixer 98 on the polarization components 72A, 72B, 74A and 74B of light beams from the optical fibers 32 and 34 propagating in the forward direction. Each of the figures is an illustration of the relative positions of the polarization components at a forward face of one of the optical elements in the polarization mixer 98 or at the forward face of optical assembly 44, as viewed from the position of the optical fibers 32 and 34.

Figure 21:
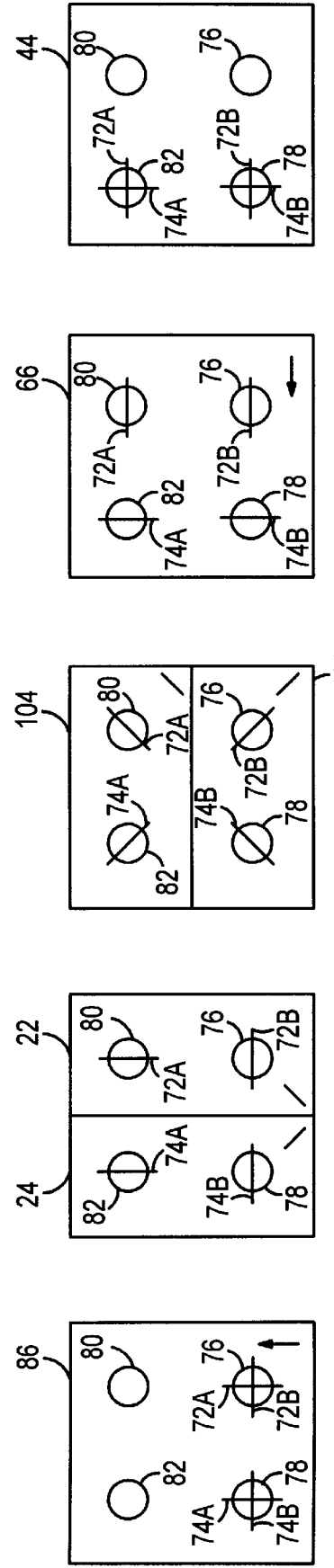

FIG. 21 shows the polarization components 72A and 72B from the optical fiber 32 and the polarization components 74A and 74B from the optical fiber 34 that are to enter input ports at the forward face of the walk-off crystal 86 of the polarization mixer 98. Identical to the input ports of polarization mixer 84 shown in FIG. 16, the input ports of polarization mixer 98 are positioned at locations 76 and 78, which are defined by the axes of the optical fibers 32 and 34, respectively. Locations 78 and 82 are the positions of output ports on the rearward face of the walk-off crystal 66.

Figure 25:
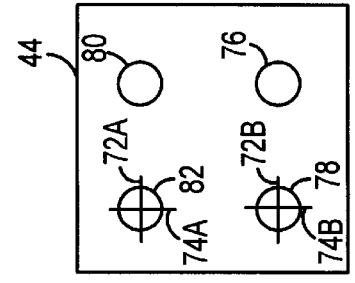
FIGS. 21–25 illustrate the operations performed upon polarization components of forward propagating light beams through the polarization mixer of FIG. 20.
Figure 24:
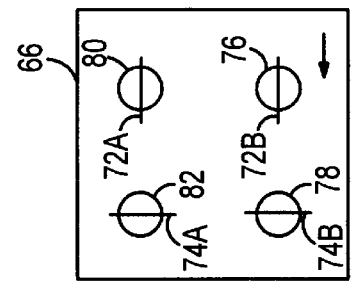
Figure 23:
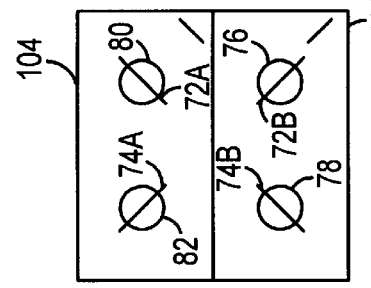
Figure 22:
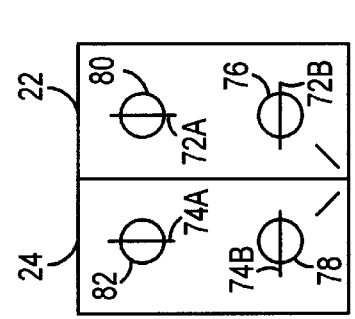

Shown in FIG. 22, the polarization component 72A and 74A have been displaced from locations 76 and 78 to locations 80 and 82, respectively, by the walk-off crystal 86. In FIG. 23, the polarization components 72A and 72B have been rotated by 45° in the clockwise direction by the right half-wave plates 22 of the split half-wave component 16, while the polarization components 74A and 74B have been rotated by 45° in the counterclockwise direction by the right half-wave plate 22. After the rotations caused by the split half-wave component 16, the polarization components 72A and 74A are further rotated by 45° in the clockwise direction by the upper half-wave plate 104 of the split half-wave component 100, as shown in FIG. 24. Also shown in FIG. 24, the other polarization components 72B and 74B have been rotated by 45° in the counterclockwise direction by the lower half-wave plate 102. Next, the polarization components 72A and 72B are laterally displaced by the walk-off crystal 66. The lateral displacement combines the polarization components 72A and 72B with the polarization components 74A and 74B, respectively, as shown in FIG. 25. The combined polarization components 72A and 74A enter the optical assembly 44 at location 82, while the combined polarization components 72B and 74B enter the optical assembly 44 at location 78.

Figure 26:
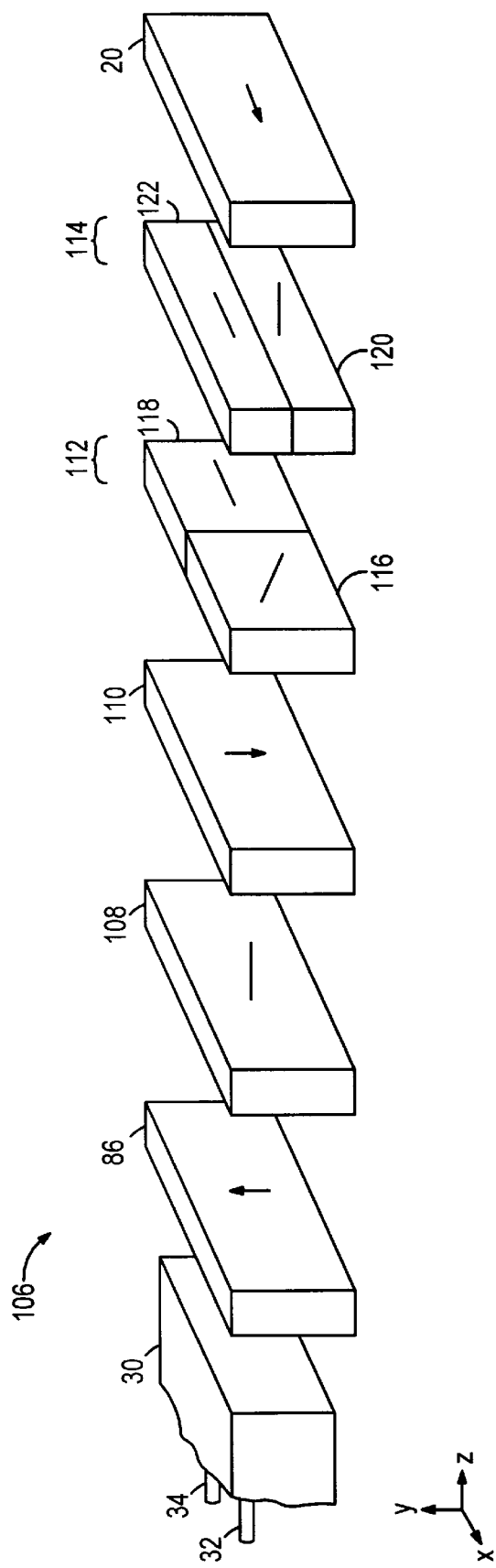
FIG. 26 is an exploded perspective view of a polarization mixer in accordance with a fifth embodiment of the invention.

With reference to FIG. 26, a polarization mixer 106 in accordance with a fifth embodiment of the invention is shown. When applicable, the same reference numerals from FIGS. 1, 10, 15 and 20 will be utilized for identical components. Again, the polarization mixer 106 may be utilized as a building block for an optical circulator, switch or filter. The polarization mixer 106 includes the walk-off crystal 86, a half-wave plate 108, a walk-off crystal 110, a split half-wave component 112, a split half-wave component 114, and the walk-off plate 20. The walk-off crystal 110 has a walk-off direction in the negative y-direction. The half-wave plate 108 is configured to provide a 90° rotation for propagating polarization components. The split half-wave component 112 is comprised of right and left half-wave plates 116 and 118, while the split half-wave component 114 is comprised of lower and upper half-wave plates 120 and 122. The half-wave plates 116 and 120 provide a 90° rotation for propagating polarization components. On the other hand, the half-wave plates 118 and 122 provide a 0° rotation. In an alternative configuration, the positions of the split half-wave components 112 and 114 are interchanged.

FIGS. 27–33 illustrate the operation of the polarization mixer 106 on polarization components 72A, 72B, 74A and 74B of light beams from the optical fibers 32 and 34 propagating in the forward direction. Each of the figures is an illustration of the relative positions of the polarization components at a forward face of one of the optical elements in the polarization mixer 106 or at the forward face of optical assembly 44, as viewed from the position of the optical fibers 32 and 34.

Figure 27:
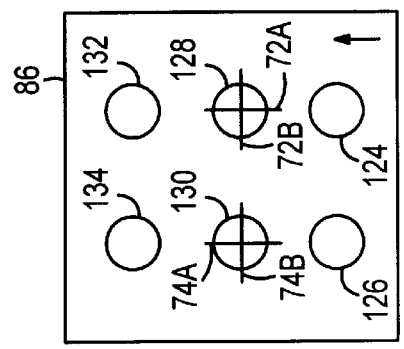

FIG. 27 shows the polarization components 72A and 72B from the optical fiber 32 and the polarization components 74A and 74B from the optical fiber 34 that are to enter input ports at the forward face of the walk-off crystal 86 of the polarization mixer 106. The input ports of polarization mixer 106 are positioned at locations 128 and 130, which are defined by the axes of the optical fibers 32 and 34, respectively. Other relevant locations are referenced 124, 126, 132 and 134. As will become apparent, locations 124 and 132 are the positions of output ports on the rearward face of the walk-off crystal 20.

Figure 30:
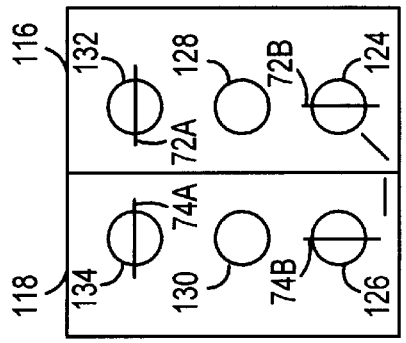
FIGS. 27–33 illustrate the operations performed upon polarization components of forward propagating light beams through the polarization mixer of FIG. 26.
Figure 29:
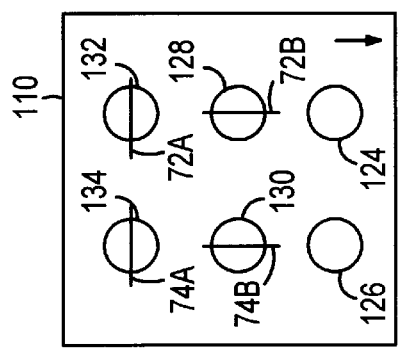
Figure 28:
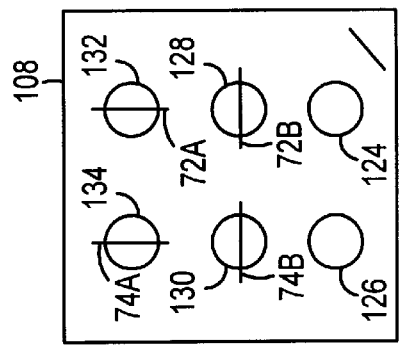
Figure 31:
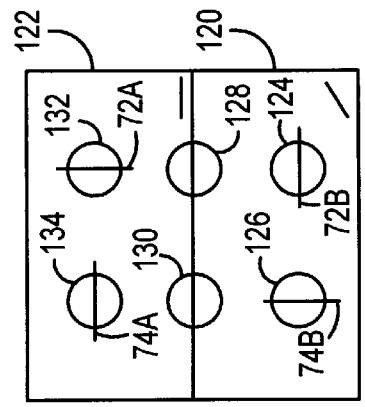

Shown in FIG. 28, the polarization component 72A and 74A have been displaced from locations 128 and 130 to locations 132 and 134, respectively, by the walk-off crystal 86. In FIG. 29, the polarization components 72A, 72B, 74A and 74B have all been rotated 90° by the half-wave plate 108. Next, the polarization components 72B and 74B are displaced from locations 128 and 130 to locations 124 and 126, respectively, by the walk-off crystal 110, as shown in FIG. 30. The polarization components 72A and 72B then propagate through the right half-wave plate 116 of the split half-wave component 112, which rotates the polarization components 72A and 72B by 90°, as shown in FIG. 31. However, the polarization components 74A and 74B propagate through the left half-wave plate 118, which causes a 0° rotation.

Figure 33:
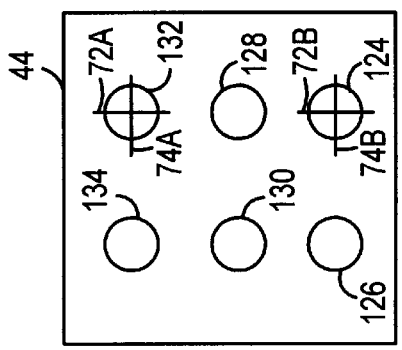
Figure 32:
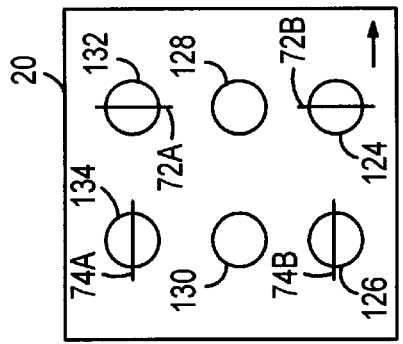

Next, the polarization components 72B and 74B travel through the lower half-wave plate 120 of the split half-wave component 114, which rotates the polarization components 72B and 74B by 90°. The other polarization components 72A and 74A, however, propagate through the upper half-wave plate 122, which causes a 0° rotation. The polarization components 72A and 72B are then laterally displaced by the walk-off crystal 20. The lateral displacement combines the polarization components 74A and 74B with the polarization components 72A and 74A, respectively, as shown in FIG. 33. The combined polarization components 72A and 74A enter the optical assembly 44 at location 132, while the combined polarization components 72B and 74B enter the optical assembly 44 at location 124.

Turning to FIG. 34, a polarization mixer 136 in accordance with a sixth embodiment of the invention is shown. When applicable, the same reference numerals from FIGS. 1, 10, 15, 20 and 26 will be utilized for identical components. The polarization mixer 136 includes the two walk-off crystals 86 and a tri-level half-wave component 138. The tri-level half-wave component 136 is comprised of three half-wave plates 140, 142 and 144. The lower half-wave plate 140 and the upper half-wave plate 144 provide a 90° rotation for propagating polarization components, while the middle half-wave plate 142 provide a 0° rotation.

FIGS. 35–38 illustrate the operation of the polarization mixer 136 on the polarization components 72A, 72B, 74A and 74B of light beams from the optical fiber 32 and 34 propagating in the forward direction. Each of the figures is an illustration of the relative positions of the polarization components at a forward face of one of the optical elements in the polarization mixer 136 or at the forward face of optical assembly 44, as viewed from the position of the optical fibers 32 and 34.

FIG. 35 shows the polarization components 72A and 72B from the optical fiber 32 and the polarization components 74A and 74B from the optical fiber 34 that are to enter input ports at the forward face of the walk-off crystal 86 of the polarization mixer 136. The input ports of polarization mixer 136 are positioned at locations 146 and 148, which are defined by the axes of the optical fibers 32 and 34, respectively. The other relevant location is referenced 150. As will become apparent, locations 148 and 150 are the positions of output ports on the rearward face of the walk-off crystal 86.

Shown in FIG. 36, the polarization component 72A and 74A have been displaced from locations 146 and 148 to locations 148 and 150, respectively, by the walk-off crystal 86. In FIG. 37, the polarization components 72A, 72B, 74A and 74B have propagated through the tri-level half-wave component 138. The polarization components 72B and 74A have traveled through the half-wave plates 140 and 144, respectively, which have rotated the polarization components 72B and 74A by 90°. However, the polarization components 72A and 74B have propagated through the middle half-wave plate 142, which provided a 0° rotation. The polarization components 72A and 72B are then vertically displaced by the walk-off crystal 86. The vertical displacement combines the polarization components 72A and 72B with the polarization components 74A and 74B, respectively, as shown in FIG. 38. The combined polarization components 72A and 74A enter the optical assembly 44 at location 150, while the combined polarization components 72B and 74B enter the optical assembly 44 at location 148.

With reference to FIG. 39, a polarization mixer 152 in accordance with a seventh embodiment of the invention is shown. When applicable, the same reference numerals from FIGS. 1, 10, 15, 20, 26 and 34 will be utilized for identical components. The polarization mixer 152 includes the walk-off crystals 86, a tri-level half-wave component 154, and the walk-off crystal 110. The tri-level half-wave component 154 is comprised of three half-wave plates 156, 158 and 160. The lower half-wave plate 156 and the upper half-wave plate 160 provide a 0° rotation for propagating polarization components, while the middle half-wave plate 158 provides a 90° rotation.

FIGS. 40–43 illustrate the operation of the polarization mixer 152 on the polarization components 72A, 72B, 74A and 74B of light beams from the optical fibers 32 and 34 propagating in the forward direction. Each of the figures is an illustration of the relative positions of the polarization components at a forward face of one of the optical elements in the polarization mixer 152 or at the forward face of optical assembly 44, as viewed from the position of the optical fibers 32 and 34.

FIG. 40 shows the polarization components 72A and 72B from the optical fiber 32 and the polarization components 74A and 74B from the optical fiber 34 that are to enter input ports at the forward face of the walk-off crystal 86 of the polarization mixer 152. Identical to the polarization mixer 136, the input ports of polarization mixer 136 are positioned at locations 146 and 148, which are defined by the axes of the optical fibers 32 and 34, respectively. The positions of output ports on the rearward face of the walk-off crystal 110 are at locations 146 and 148.

Shown in FIG. 41, the polarization components 72A and 74A have been displaced from locations 146 and 148 to locations 148 and 150, respectively, by the walk-off crystal 86. In FIG. 42, the polarization components 72A, 72B, 74A and 74B have propagated through the tri-level half-wave component 154. The polarization components 72B and 74A have traveled through the half-wave plates 156 and 160, respectively, which have rotated the polarization components 72B and 74A by 0°. However, the polarization components 72A and 74B have propagated through the middle half-wave plate 158, which provided a 90° rotation. The polarization components 72A and 72B are then vertically displaced by the walk-off crystal 110. The vertical displacement combines the polarization components 74A and 74B with the polarization components 72A and 72B, respectively, as shown in FIG. 43. The combined polarization components 72A and 74A enter the optical assembly 44 at location 148, while the combined polarization components 72B and 74B enter the optical assembly 44 at location 146.

The polarization mixers 10, 62, 84, 98, 106, 136 and 152 of FIGS. 1–43 are structurally dissimilar from each other. However, all the polarization mixers operate in a similar manner. The polarization mixers in accordance with the present invention separate two light beams from the optical fibers 32 and 34 into orthogonal polarization components. The polarization components are selectively rotated, such that the two polarization components from optical fiber 32 are orthogonally orientated with one of the polarization components from the optical fiber 34. The polarization components are then combined to form two new light beams. Each of the new light beams is comprised of a polarization component from the optical fiber 32 and a polarization component from the optical fiber 34.

Although the polarization mixers 10, 62, 84, 98, 106, 136 and 152 have been described with specific arrangements, alternative configurations are possible without affecting the overall operation of the polarization mixers. Alternative configurations may include changing the walk-off directions of the walk-off crystal and/or using different half-wave plates in the split, tri-level or quadripartite half-wave components. In addition, the optical elements may be rotated about the z-axis and/or rearranged without affecting the overall operation.

Figure 44:
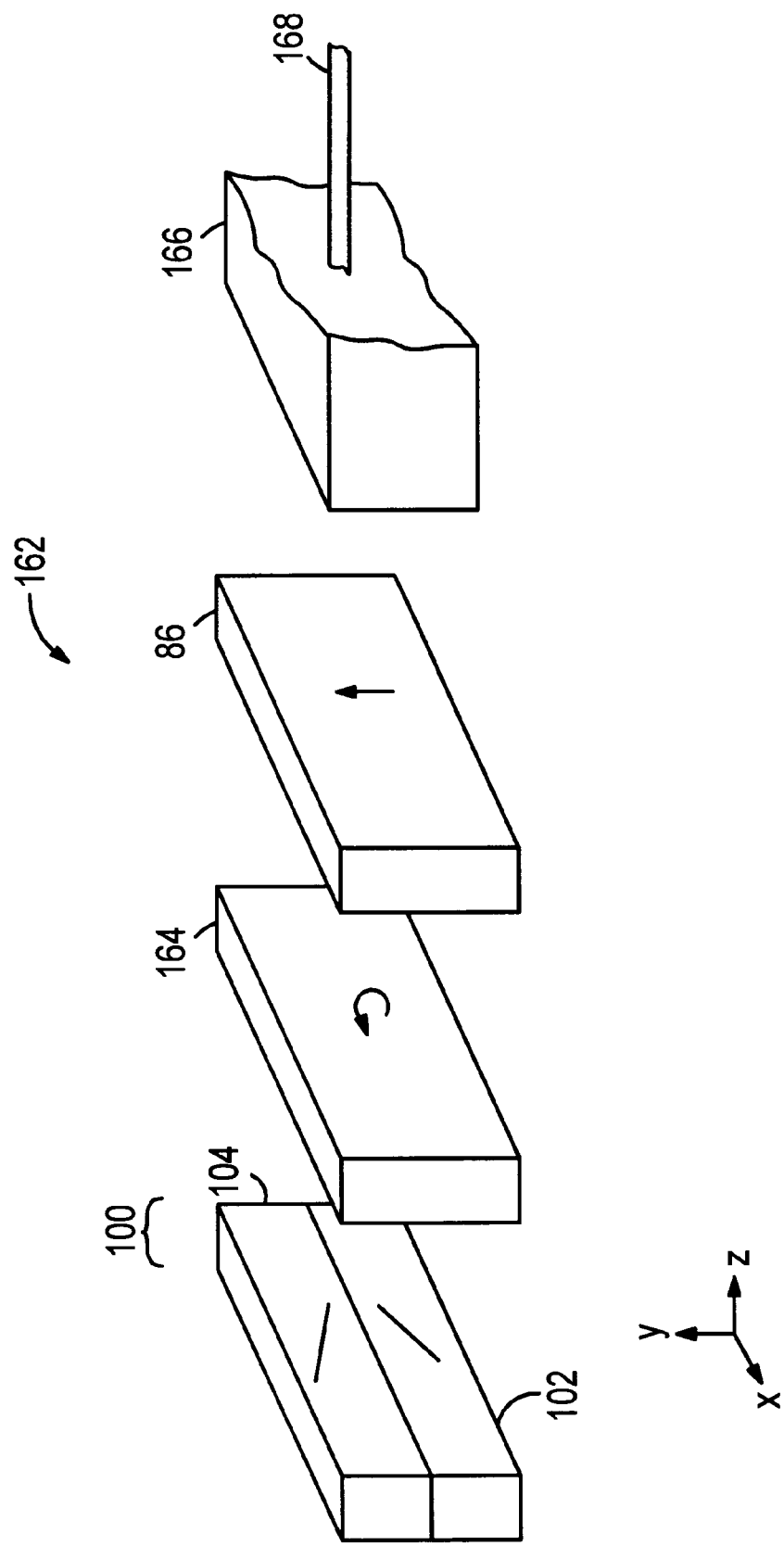
FIG. 44 is an exploded perspective view of a first optical assembly that can be positioned with a polarization mixer in accordance with the invention to construct an optical circulator.

Turning to FIG. 44, an exploded perspective view of an optical assembly 162 that can be combined with any one of the polarization mixers 10, 62, 84, 98, 106, 136 and 152 to form an optical circulator is shown. The optical assembly 162 includes the split half-wave component 100, a Faraday rotator 164, and the walk-off crystal 86. Also shown in FIG. 44 is a fiber holder 166 and an optical fiber 168. The fiber holder 166 may be fabricated in the same fashion as the fiber holder 30. The optical fiber 168 may be a TEC optical fiber. The Faraday rotator 164 provides 45° rotation in the clockwise direction for forward propagating polarization components. The optical assembly 162 may also include a lens (not shown), positioned between the walk-off crystal 86 and the optical fiber 168, to focus light beams propagating through the optical assembly 162 and the optical fiber 168.

The optical assembly 162 is configured to operate in conjunction with one of the polarization mixers of the invention in order to direct a light beam from one of the two optical fibers 32 and 34 to the optical fiber 168, while directing a light beam from the optical fiber 168 to the other optical fiber. For example, the optical assembly 162 may direct a light beam from the optical fiber 32 to be transmitted to the optical fiber 168. However, a light beam from the optical fiber 168 will be directed to the optical fiber 34. Therefore, the optical fiber 168 is a bidirectional optical fiber, receiving light signals from the optical fiber 32 and transmitting light signals to the optical fiber 34.

FIGS. 45–48 illustrate the operation of the optical assembly 162 on polarization components of light beams from the optical fibers 32 and 34 propagating in the forward direction, i.e., positive z-direction. Each of the figures is an illustration of the relative positions of the polarization components at a forward face of one of the optical elements in the optical assembly or at the forward face of fiber holder 166, as viewed from the position of the optical fibers 32 and 34.

FIG. 45 shows polarization components 170A and 172A that are to enter a first input port at location 176 and polarization components 170B and 172B that are to enter a second port at location 174. The input ports are located at the forward face of the split half-wave component 100 of the optical assembly 162. The polarization components 170A, 170B, 172A and 172B represent light beams from the optical fibers 32 and 34. The origin of the polarization components depends upon the polarization mixer that is attached to the optical assembly 162. The other relevant location is referenced 178. Locations 174 and 176 coincide with the output ports of the polarization mixer that is being combined with the optical assembly 162. As will become apparent, location 176 also coincides with the position of an output port on the rearward face of the walk-off crystal 86. The optical fiber 168 is optically aligned with the output port and, consequently, also with location 176.

The polarization components 170A and 172A propagate through the half-wave plate 104 of the split half-wave component 100, which rotates the polarization components 170A and 172A by 45° in the clockwise direction, as shown in FIG. 46. However, the polarization components 170B and 172B propagate through the half-wave plate 102 of the split half-wave component 100, which rotates the polarization components 170B and 172B by 45° in the counterclockwise direction. Next, the polarization components 170A, 170B, 172A and 172B travel through the Faraday rotator 164. Shown in FIG. 47, the polarization components 170A, 170B, 172A and 172B have been rotated by 45° in the clockwise direction by the Faraday rotator 164. The overall effect of the rotations caused by the split half-wave component 100 and the Faraday rotator 164 on the polarization components 170A and 172A is a 90° rotation. However, the overall effect on the polarization components 170B and 172B is a 0° rotation.

Next, the polarization components 170B and 172A are vertically displaced from locations 174 and 176 to locations 176 and 178, respectively, by the walk-off crystal 86, as shown in FIG. 48. The polarization components 170A and 170B exit the output port of the walk-off crystal 86 and are transmitted to the optical fiber 168. The other polarization components 172A and 172B are misaligned with respect to the optical fiber 168. Therefore, the polarization components 172A and 172B are not transmitted to the optical fiber 168.

Briefly, the optical assembly 162 receives vertically orientated polarization components at locations 174 and 176 and transmits them to the optical fiber 168. When the optical assembly 162 is attached to a polarization mixer to form an optical circulator, the fiber coupling configuration of the circulator will depend upon the orientation of the polarization components of light beams from the optical fibers 32 and 34 when entering the optical assembly 162. For example, if an optical circulator is fabricated using the polarization mixer 10 and the optical assembly 162, a light beam from the optical fiber 32 will be transmitted to the optical fiber 168. The reason for this fiber coupling configuration is that the polarization mixer 10 operates to manipulate the polarization components of the light beam from the optical fiber 32 such that the polarization components are vertically orientated and exit from both of the output ports of the polarization mixer 10. Since the input ports of the optical assembly 162 are aligned with the output ports of the polarization mixer 10, these polarization components from the optical fiber 32 will be transmitted to the optical fiber 168. However, if an optical circulator is fabricated with the optical assembly 162 and a polarization mixer that horizontally orientates polarization components of a light beam from the optical fiber 32, the light beam from the optical fiber 32 will not be transmitted to the optical fiber 162.

FIGS. 49–52 illustrate the operation of the optical assembly 162 on polarization components of a light beam from the optical fiber 168 propagating in the rearward direction, i.e., negative z-direction. Each of the figures is an illustration of the relative positions of the polarization components at a forward face of one of the optical elements in the optical assembly or at the forward face of fiber holder 166, as viewed from the position of the optical fibers 32 and 34.

FIG. 49 shows polarization components 180A and 180B of a light beam emitted from the optical fiber 168. The polarization components 180A and 180B are positioned at location 176, which is aligned with the optical fiber 168. The polarization components 180A and 180B propagate through the walk-off crystal 86, which displaces the polarization component 180A from location 176 to location 174, as shown in FIG. 50. Next, the polarization components 180A and 180B travel through the Faraday rotator 164. Shown in FIG. 51, the polarization components 180A and 180B have been rotated by 45° in the clockwise direction by the Faraday rotator 164. The polarization components 180A and 180B then propagate through the split half-wave component 100. The polarization component 180A travels through the half-wave plate 102 of the split half-wave component 100, while the polarization component 180B travels through the half-wave plate 104. The polarization component 180A is rotated by 45° in the clockwise direction by the half-wave plate 102, as shown in FIG. 52. On the other hand, the polarization component 180B is rotated by 45° in the counterclockwise direction by the half-wave plate 104. The polarization components 180A and 180B exit the optical assembly 162 in a horizontal orientation at locations 174 and 176, respectively.

Depending upon the polarization mixer that is attached to the optical assembly 162 to form the optical circulator, the polarization components 180A and 180B will be transmitted to either the optical fiber 32 or 34. If the attached polarization mixer is a type similar to the polarization mixer 10 of FIG. 1, the polarization components 180A and 180B will be transmitted to the optical fiber 34. Because the polarization mixers of the invention are exclusively comprised of reciprocal optical elements, the mixers operate such that rearward propagating polarization components will retrace the propagation paths of forward propagating polarization components from the optical fibers 32 and 34, assuming that the rearward propagating polarization components are orientated in the exact states at the rearward face of the polarization mixer as the forward propagating polarization components at the same position.

Figure 53:
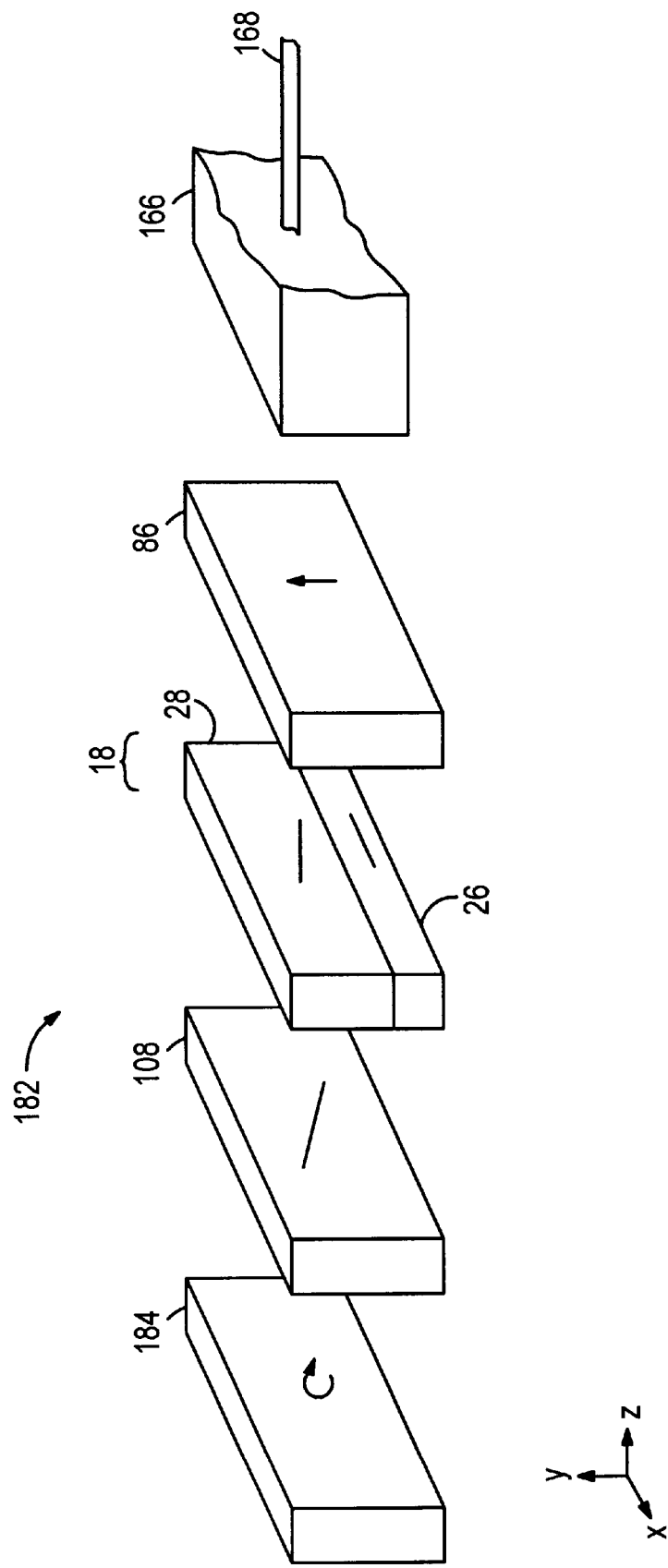
FIG. 53 is an exploded perspective view of a second optical assembly that can be positioned with a polarization mixer in accordance with the invention to construct an optical circulator.

With reference to FIG. 53, a second optical assembly 182 that can also be combined with any one of the polarization mixers 10, 62, 84, 98, 106, 136 and 152 to form an optical circulator is shown. The optical assembly 182 includes a Faraday rotator 184, the half-wave plate 108, the split half-wave component 18, and the walk-off crystal 86. Similar to the optical assembly 162, the optical assembly 182 may include a lens (not shown), positioned between the walk-off crystal 86 and the optical fiber 168, to focus light beams propagating through the optical assembly 182 and the optical fiber 168. The Faraday rotator 184 provides 45° rotation in the counterclockwise direction for forward propagating polarization components.

FIGS. 54–58 illustrate the operation of the optical assembly 182 on polarization components of light beams from the optical fiber 32 and 34 propagating in the forward direction. Each of the figures is an illustration of the relative positions of the polarization components at a forward face of one of the optical elements in the optical assembly 182 or at the forward face of fiber holder 166, as viewed from the position of the optical fibers 32 and 34.

FIG. 54 shows the polarization components 170A and 172A that are about to enter a first input port at location 176 and the polarization components 170B and 172B that are about to enter a second port at location 174. The input ports are located at the forward face of the Faraday rotator 184 of the optical assembly 182. Again, the polarization components 170A, 170B, 172A and 172B represent light beams from the optical fibers 32 and 34. Locations 174 and 176 coincide with the output ports of the polarization mixer that is being combined with the optical assembly 182. Identical to the optical assembly 162, location 176 coincides with the position of an output port on the rearward face of the walk-off crystal 86 of the optical assembly 182. The optical fiber 168 is optically aligned with location 176.

After propagating through the Faraday rotator 184, the polarization components 170A, 170B, 172A and 172B are rotated by 45° in the counterclockwise direction by the Faraday rotator 184, as shown in FIG. 55. Next, the polarization components 170A, 170B, 172A and 172B propagate through the half-wave plate 108, which rotates the polarization components 170A, 170B, 172A and 172B by 45° in the clockwise direction, as shown in FIG. 56. The polarization components 170A and 172A then travel through the half-wave plate 28 of the split half-wave component 18. Shown in FIG. 57, the half-wave plate 28 has rotated the polarization components 170A and 172A by 90°. However, the polarization components 170B and 172B propagate through the half-wave plate 20 of the split half-wave component 18. The half-wave plate 20 has provided a 0° rotation for the polarization components 170B and 172B.

Next, the polarization components 170B and 172A are vertically displaced from locations 174 and 176 to locations 176 and 178, respectively, by the walk-off crystal 86, as shown in FIG. 58. The polarization components 170A and 170B exit the output port of the walk-off crystal 86 and are transmitted to the optical fiber 168. The other polarization components 172A and 172B are misaligned with respect to the optical fiber 168. Therefore, the polarization components 172A and 172B are not transmitted to the optical fiber 168.

FIGS. 59–63 illustrate the operation of the optical assembly 182 on polarization components of a light beam from the optical fiber 168 propagating in the rearward direction, i.e., negative z-direction. Each of the figures is an illustration of the relative positions of the polarization components at a forward face of one of the optical elements in the optical assembly 182 or at a forward face of the fiber holder 166, as viewed from the position of the optical fibers 32 and 34.

FIG. 59 shows the polarization components 180A and 180B of the light beam emitted from the optical fiber 168. The polarization components 180A and 180B are positioned at location 176, which is aligned with the optical fiber 168. The polarization components 180A and 180B propagate through the walk-off crystal 86, which displaces the polarization component 180A from location 176 to location 174, as shown in FIG. 60. The polarization component 180B then travels through the half-wave plate 28 of the split half-wave component 18, while the polarization component 180A travels through the half-wave plate 26. The polarization component 180B is rotated 90° by the half-wave plate 28, as shown in FIG. 61. However, the polarization component 180A is unchanged by the half-wave plate 26. Next, the polarization components 180A and 180B propagate through the half-wave plate 108, which rotates them by 45° in the counterclockwise direction, as shown in FIG. 62. The polarization components 180A and 180B then travel through the Faraday rotator 184. Shown in FIG. 63, the polarization components 180A and 180B have been rotated by 45° in the counterclockwise direction by the Faraday rotator 184. The polarization components 180A and 180B exit the optical assembly 182 in a horizontal orientation at locations 174 and 176, respectively.

As part of an optical circulator, the optical assembly 182 functions almost identically to the optical assembly 162. The optical assembly 182 receives polarization components of light beams from the optical fibers 32 and 34 that are propagating in the forward direction. Only the polarization components that are vertically orientated are transmitted to the optical fiber 168. In the rearward direction, the optical assembly 182 manipulates polarization components of a light beam from the optical fiber 168 such that the two polarization components are spatially displaced and horizontally orientated in order to couple to one of the optical fibers 32 and 34. The fiber coupling from the optical fiber 168 and one of the optical fibers 32 and 34 will depend on the type of polarization mixer used to construct the optical circulator.

Although the polarization mixers in accordance with the invention have been described above with reference to an optical circulator, other optical devices may be constructed with the polarization mixer. The polarization mixers may be utilized as a building block to construct optical switches, filters and other comparable optical device.

Figure 64:
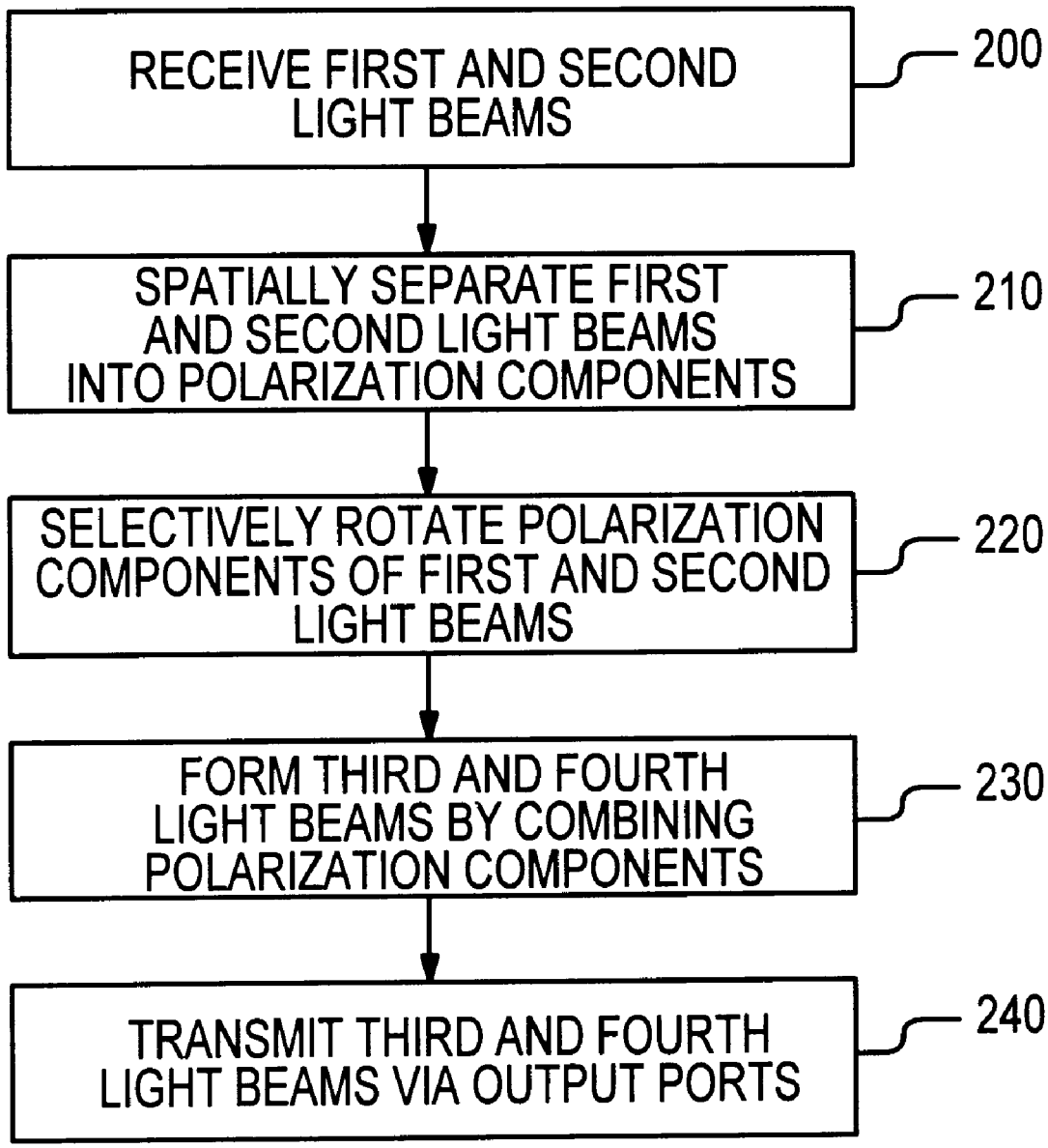
FIG. 64 is a flow diagram of a method of mixing polarization components in accordance with the invention.

Shown in FIG. 64 is a flow diagram illustrating a method of mixing polarization components of light signals utilizing an optical subassembly in accordance with the invention. At step 200, first and second light beams are received at input ports that are located on the forward face of the optical subassembly. The first and second light beams are then spatially separated into their two orthogonal polarization components by the optical subassembly, at step 210. Next, the polarization components are selectively rotated, at step 220, such that both of the polarization components of the first light beam are orthogonally orientated with respect to at least one of the polarization components of the second light beam. At step 230, the polarization components are combined such that third and fourth light beams are formed. Each of the third and fourth light beams is comprised of a polarization component of the first light beam and a polarization component of the second light beam. Lastly, the third and fourth light beams are transmitted via output ports located on the rearward face of the optical subassembly, at step 240.

What is claimed is:

1. An optical subassembly for mixing polarization components of light signals comprising:

separating means positioned to receive first and second light beams from a pair of optical lines for dividing said first light beam into first and second polarization components and dividing said second light beam into third and fourth polarization components;

rotating means optically aligned with said separating means for selectively rotating said polarization components such that said first and second polarization components of said first light beam are perpendicularly orientated with respect to at least one of said third and fourth polarization components of said second light beam; and combining means optically coupled to said rotating means for optically aligning selected polarization components of said first and second light beams to form third and fourth light beams, each of said third and fourth light beams including one of said first and second polarization components of said first light beam and one of said third and fourth polarization components of said second light beam, said combining means having output ports for emitting said third and fourth light beams.

2. The optical subassembly of claim 1 wherein said pair of optical lines are two thermally expanded core (TEC) optical fibers which are positioned adjacent to a forward face of said separating means.

3. The optical subassembly of claim 1 wherein said rotating means is a non-magnetic polarization rotator configured to provide alternative rotations of said polarization components of said first and second light beams, depending upon propagation paths of said polarization components.

4. The optical subassembly of claim 3 wherein said non-magnetic polarization rotator includes an arrangement of a plurality of half-wave plates, each of said half-wave plates providing one of said alternative rotations.

5. The optical subassembly of claim 4 wherein said arrangement of half-wave plates includes a first split half-wave component formed by said adjacent first and second half-wave plates, each of said first and second half-wave plates providing a distinct polarization rotation.

6. The optical subassembly of claim 5 wherein said arrangement of half-wave plates further includes a second split half-wave component optically aligned with said first split half-wave component, said second split half-wave component being formed of adjacent third and fourth half-wave plates, said first and second split half-wave components being positioned such that each of said polarization components of said first and second light beams propagates through a unique pair of said half-wave plates.

7. The optical subassembly of claim 4 wherein said arrangement of half-wave plates includes a tri-level half-wave component formed by three said half-wave plates, said three half-wave plates providing said alternative rotations.

8. The optical subassembly of claim 1 wherein said separating means includes a first walk-off crystal having a predetermined walk-off direction.

9. The optical subassembly of claim 8 wherein said separating means further includes a second walk-off crystal having a walk-off direction orthogonal to said predetermined walk-off direction of said first walk-off crystal.

10. The optical subassembly of claim 8 wherein said separating means further includes a second walk-off crystal having a walk-off direction opposite of said predetermined walk-off direction.

11. An optical subassembly that can be utilized as a building block to fabricate a variety of optical devices comprising:

a first optical unit having input ports for receiving first and second light beams from a pair of optical lines, said first optical unit being fabricated of crystalline material to separate each of said first and second light beams into two polarization components;

an optical rotator optically aligned to said first optical unit, said optical rotator being structurally configured to align said two polarization components of said first light beam in a parallel orientation that is orthogonal with respect to an orientation of at least one of said two polarization components of said second light beam; and a second optical unit optically connected with said first optical unit, said second optical unit being fabricated of said crystalline material and being dimensioned to combine said polarization components to form third and fourth light beams, each of said third and fourth light beams including one of said two polarization components of said first light beam and one of said two polarization components of said second light beam, said second optical unit having output ports on a rearward face of said second optical unit to emit said third and fourth light beams.

12. The optical subassembly of claim 11 wherein said optical rotator consists of half-wave plates positioned to provide said orthogonal alignment of said two polarization components of said first light beam relative to said one polarization component of said second light beam.

13. The optical subassembly of claim 12 wherein said optical rotator includes a split half-wave component formed by two of said half-wave plates that are juxtaposed on a plane generally perpendicular to propagating directions of said first and second light beam.

14. The optical subassembly of claim 12 wherein said optical rotator includes a tri-level half-wave component formed by three of said half-wave plates that are juxtaposed on a plane generally perpendicular to propagating directions of said first and second light beam.

15. The optical subassembly of claim 11 wherein said pair of optical lines are two thermally expanded core (TEC) optical fibers, said TEC optical fibers being optically aligned with said output ports of said second optical unit.

16. A method of mixing polarization components of light signals utilizing an optical subassembly comprising steps of:

receiving first and second light beams at input ports located on a forward face of said optical subassembly;

spatially separating each of said first and second light beams into two polarization components within said optical subassembly;

selectively rotating said polarization components of said first and second light beams such that said two polarization components of said first light beam are in parallel and are orthogonal to at least one of said two polarization components of said second light beam;

forming third and fourth light beams from said four polarization components of said first and second light beams such that each of said third and fourth light beams is a combination of one of said two polarization components of said first light beam with one of said two polarization components of said second light beam; and transmitting said third and fourth light beams from said optical subassembly via output ports located on a rearward face of said optical subassembly.

17. The method of claim 16 further comprising a step of providing first and second thermally expanded core (TEC) optical fibers to transmit said first and second light beams to said optical subassembly.

18. The method of claim 16 wherein said step of selectively rotating said polarization components of said first and second light beams includes non-magnetically changing orientations of selected polarization components of said first and second light beams.

19. The method of claim 16 wherein said step of selectively rotating said polarization components of said first and second light beams includes orthogonally pivoting one of said two polarization components from each of said first and second light beams.

20. The method of claim 16 wherein each of said steps of spatially separating each of said first and second light beam and forming said third and fourth light beams includes selectively displacing said four polarization components of said first and second light beams utilizing walk-off crystals.

* * * * *